United States Patent
Gheorghiu et al.

(10) Patent No.: US 9,980,169 B2
(45) Date of Patent: May 22, 2018

(54) MEASUREMENT GAPS IN CARRIER AGGREGATION

(71) Applicant: QUALCOMM Incorporated, San Diego, CA (US)

(72) Inventors: Valentin Alexandru Gheorghiu, Tokyo (JP); Masato Kitazoe, Hachiouji (JP); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/152,890

(22) Filed: May 12, 2016

(65) Prior Publication Data

US 2016/0337893 A1 Nov. 17, 2016

Related U.S. Application Data

(60) Provisional application No. 62/162,543, filed on May 15, 2015.

(51) Int. Cl.
*G01R 31/08* (2006.01)
*H04W 24/10* (2009.01)
*H04L 5/00* (2006.01)

(52) U.S. Cl.
CPC ............ *H04W 24/10* (2013.01); *H04L 5/001* (2013.01); *H04L 5/0094* (2013.01)

(58) Field of Classification Search
CPC ..... H04W 24/10; H04W 24/08; H04W 24/04; H04L 5/001; H04L 5/094
See application file for complete search history.

(56) References Cited

U.S. PATENT DOCUMENTS 9,544,118 B2 * 1/2017 Moon ................. H04L 5/0053
2010/0267394 A1* 10/2010 Wu ...................... H04W 24/10
455/450

(Continued)

FOREIGN PATENT DOCUMENTS

EP 2579487 A1 4/2013

(Continued)

OTHER PUBLICATIONS

IPEA/EP, Second Written Opinion of the international Preliminary Examining Authority, Int'l Application No. PCT/US2016/032542, dated Apr. 26, 2017, European Patent Office, Rijswijk, NL, 9 pgs.

(Continued)

*Primary Examiner* — Robert Wilson
(74) *Attorney, Agent, or Firm* — Holland & Hart LLP

(57) ABSTRACT

Methods, systems, and devices are described for wireless communication. A user equipment (UE) may signal a band-specific measurement gap indication based on the capability of a set of receivers to measure target frequency bands while monitoring a set of component carriers (CCs). The UE may receive a measurement gap configuration for a first component carrier (CC) associated with measuring the target frequency bands accounting for the band-specific measurement gap indication. The UE may then perform a measurement on one or more of the target frequency bands according to the measurement gap configuration while continuing to monitor other configured CCs for downlink messages and transmit uplink control messages during gaps configured for the first CC (e.g., using a different receiver). In some examples the measurement gap configuration message includes configuration options and the UE may select the measurement gap configuration for the first CC from the set of available options.

46 Claims, 20 Drawing Sheets

(56) References Cited

U.S. PATENT DOCUMENTS

| | | | | |
|---|---|---|---|---|
| 2012/0113866 A1* | 5/2012 | Tenny | .................. | H04W 24/10 370/254 |
| 2012/0178465 A1* | 7/2012 | Lin | ...................... | H04W 24/10 455/450 |
| 2013/0235755 A1* | 9/2013 | Lucky | .................. | H04W 72/12 370/252 |
| 2014/0341192 A1* | 11/2014 | Venkob | .................. | H04L 5/001 370/336 |
| 2015/0124728 A1* | 5/2015 | Bergstrom | .............. | H04L 5/001 370/329 |
| 2016/0337893 A1* | 11/2016 | Gheorghiu | ............ | H04W 24/10 |

OTHER PUBLICATIONS

Mediatek Inc., "Discussion on Measurement Gap Signalling for Rel-10 CA UE," 3GPP TSG RAN WG2 Meeting #72bis, R2-110265, Dublin, Ireland, Jan. 17-21, 2011 5 pgs., XP_050492967, 3rd Generation Partnership Project.

ISA/EP, International Search Report and Written Opinion of the International Searching Authority, Int'l Application No. PCT/US2016/032542, dated Sep. 9, 2016, European Patent Office, Rijswijk, NL, 14 pgs.

* cited by examiner

MEASUREMENT GAPS IN CARRIER AGGREGATION

CROSS REFERENCES

The present application for patent claims priority to U.S. Provisional Patent Application No. 62/162,543 by Gheorghiu et al., entitled "Measurement Gaps in Carrier Aggregation," filed May 15, 2015, assigned to the assignee hereof.

BACKGROUND

The following relates generally to wireless communication, and more specifically to measurement gaps in carrier aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple access communications system may include a number of base stations, each simultaneously supporting communication for multiple communication devices, which may be otherwise known as user equipment (UE).

In some cases, a user equipment (UE) may be configured with multiple component carriers (CCs) in a carrier aggregation (CA) configuration. A UE in a CA configuration may use multiple receivers to communicate on the different CCs. In some systems, fixed-length measurement gaps may be provided to assist the UE to perform measurements on neighboring cells. During scheduled measurement gaps, the UE pauses its communication with a serving base station and is not expected to monitor communication with the serving base station while it tunes its radio or takes other action to measure a target frequency band. Such pauses in communicating with the serving base station may cause delay or reduced throughput which may be exacerbated when the UE is configured with a large number of component carriers.

SUMMARY

A user equipment (UE) may signal a band-specific measurement gap indication based on the capability of a set of receivers to measure target frequency bands while monitoring a set of component carriers (CCs) of a carrier aggregation (CA) configuration. The UE may receive a measurement gap configuration for a first CC associated with one or more of the target frequency bands based on the band-specific measurement gap indication. The UE may then perform a measurement of one or more of the target frequency bands according to the measurement gap configuration, but may still receive downlink messages and transmit uplink control messages associated with a second CC during gaps configured for the first CC (e.g., using a different receiver). In some examples, the UE signals its capabilities with respect to a particular CA configuration and target frequency band(s) by providing an indication of which CC or CCs need gaps to facilitate measurement by a corresponding receiver. Similarly, the UE can signal its support for using different measurement gaps patterns with different target frequency bands in a given CA configuration. The base station can utilize information about the UE capabilities in different configurations in order to create an optimized measurement configuration for the UE. For example, the base station can select a CC for measurement gaps according to whether there is a corresponding uplink component carrier, whether the corresponding UL carrier provides a control channel, whether control information is sent on a shared UL channel, etc. The base station could likewise choose a CC for measurement gaps based on criteria for minimizing interruption to DL operations, etc. such that, in keeping with UE capabilities, the UE continues to communicate on the non-gapped CCs of its CA configuration. In some examples, the base station can send a measurement gap configuration message that may include a set of configuration options and the UE may select the measurement gap configuration for the first CC from the set of configuration options. In other examples, the measurement gap configuration message may include an indication not to perform measurements on the first CC during a measurement gap.

A method of wireless communication is described. The method may include signaling a band-specific measurement gap indication based at least in part on a capability of a plurality of receivers to measure one or more target frequency bands while monitoring a plurality of CCs of a CA configuration, and receiving a measurement gap configuration message comprising a measurement gap configuration for at least one first CC of the plurality of CCs associated with measurement of at least one of the target frequency bands, wherein the measurement gap configuration is based at least in part on the band-specific measurement gap indication.

An apparatus for wireless communication is described. The apparatus may include means for signaling a band-specific measurement gap indication based at least in part on a capability of a plurality of receivers to measure one or more target frequency bands while monitoring a plurality of CCs of a CA configuration, and means for receiving a measurement gap configuration message comprising a measurement gap configuration for at least one first CC of the plurality of CCs associated with at least one of the target frequency bands, wherein the measurement gap configuration is based at least in part on the band-specific measurement gap indication.

A further apparatus for wireless communication is described. The apparatus may include a processor, memory in electronic communication with the processor, and instructions stored in the memory and operable, when executed by the processor, to cause the apparatus to signal a band-specific measurement gap indication based at least in part on a capability of a plurality of receivers to measure one or more target frequency bands while monitoring a plurality of CCs of a CA configuration, and receive a measurement gap configuration message comprising a measurement gap configuration for at least one first CC of the plurality of CCs associated with at least one of the target frequency bands, wherein the measurement gap configuration is based at least in part on the band-specific measurement gap indication.

A non-transitory computer-readable medium storing code for wireless communication is described. The code may include instructions executable to signal a band-specific measurement gap indication based at least in part on a capability of a plurality of receivers to measure one or more target frequency bands while monitoring a plurality of CCs of a CA configuration, and receive a measurement gap configuration message comprising a measurement gap configuration for at least one first CC of the plurality of CCs associated with at least one of the target frequency bands, wherein the measurement gap configuration is based at least in part on the band-specific measurement gap indication.

In some examples of the method, apparatuses, or non-transitory computer-readable medium described herein, the measurement gap configuration message comprises an indication to monitor at least one second CC of the plurality of CCs during at least one gap of the measurement gap configuration for the at least one first CC. Additionally or alternatively, some examples may include processes, features, means, or instructions for transmitting an uplink control message associated with the second CC during the at least one gap.

In some examples of the method, apparatuses, or non-transitory computer-readable medium described herein, the measurement gap configuration message comprises an indication of one or more gaps during which monitoring the at least one first CC can be interrupted for measuring at least one of the one or more target frequency bands while monitoring of other CCs in the CA configuration continues without interruption. Additionally or alternatively, in some examples the measurement gap configuration message comprises an indication of different measurement gap configurations for different CCs of the plurality of CCs.

In some examples of the method, apparatuses, or non-transitory computer-readable medium described herein, the measurement gap configuration message comprises an indication not to perform measurements on the at least one first CC during a measurement gap.

In some examples of the method, apparatuses, or non-transitory computer-readable medium described herein, the one or more target frequency bands comprise one or more frequency bands in a shared spectrum or an unlicensed spectrum.

In some examples of the method, apparatuses, or non-transitory computer-readable medium described herein, the band-specific measurement gap indication comprises an indication of a subset of the plurality of CCs associated with measuring each of the one or more target frequency bands. Additionally or alternatively, in some examples the band-specific measurement gap indication comprises a bitmap associating each of the plurality of CCs with measurement gaps on the one or more target frequency bands.

Some examples of the method, apparatuses, or non-transitory computer-readable medium described herein may further include processes, features, means, or instructions for signaling one or more measurement gap patterns available for use with the CA configuration. Additionally or alternatively, in some examples the band-specific measurement gap indication comprises a plurality of supported frequency band measurement gap associations corresponding to a plurality of CA receiver configurations.

Some examples of the method, apparatuses, or non-transitory computer-readable medium described herein may further include processes, features, means, or instructions for performing a measurement on one or more of the target frequency bands according to the measurement gap configuration. Additionally or alternatively, in some examples the measurement gap configuration message comprises a plurality of measurement gap configuration options, and selecting the measurement gap configuration for the at least one first CC from the plurality of measurement gap configuration options.

In some examples of the method, apparatuses, or non-transitory computer-readable medium described herein, the measurement gap configuration is selected based at least in part on minimizing disruption of monitoring the plurality of CCs, minimizing disruption of UL transmission, or both. Additionally or alternatively, in some examples the band-specific measurement gap indication comprises a separate indication based at least in part on the capability of each of the plurality of receivers to measure combinations of the one or more target frequency bands.

A method of wireless communication is described. The method may include determining, in a CA configuration, that at least one first CC with an UL control channel is unavailable during a measurement gap, and transmitting UL control information on a second CC with a control channel during the measurement gap based at least in part on the determination.

An apparatus for wireless communication is described. The apparatus may include means for determining, in a CA configuration, that at least one first CC with an UL control channel is unavailable during a measurement gap, and means for transmitting UL control information on a second CC with a control channel during the measurement gap based at least in part on the determination.

A further apparatus for wireless communication is described. The apparatus may include a processor, memory in electronic communication with the processor, and instructions stored in the memory and operable, when executed by the processor, to cause the apparatus to determine, in a CA configuration, that at least one first CC with an UL control channel is unavailable during a measurement gap, and transmit UL control information on a second CC with a control channel during the measurement gap based at least in part on the determination.

A non-transitory computer-readable medium storing code for wireless communication is described. The code may include instructions executable to determine, in a CA configuration, that at least one first CC with an UL control channel is unavailable during a measurement gap, and transmit UL control information on a second CC with a control channel during the measurement gap based at least in part on the determination.

Some examples of the method, apparatuses, or non-transitory computer-readable medium described herein may further include processes, features, means, or instructions for autonomously selecting the second CC, wherein the UL control information is transmitted based at least in part on the autonomous selection. Additionally or alternatively, in some examples the second CC is autonomously selected based at least in part on a set of predetermined priorities, network signaling, a radio frequency (RF) architecture of the UE, or a combination thereof.

Some examples of the method, apparatuses, or non-transitory computer-readable medium described herein may further include processes, features, means, or instructions for receiving a measurement gap configuration, wherein determining that the at least one first CC is unavailable is based at least in part on the measurement gap configuration. Additionally or alternatively, in some examples the UL control information comprises channel state feedback, hybrid automatic repeat request (HARQ) feedback, or both.

A method of wireless communication is described. The method may include receiving a band-specific measurement gap indication based at least in part on a capability of a plurality of receivers of the UE to measure one or more target frequency bands while monitoring a plurality of CCs of a CA configuration, and configuring the UE for measurement gaps based at least in part on the indication of the capabilities.

An apparatus for wireless communication is described. The apparatus may include means for receiving a band-specific measurement gap indication based at least in part on a capability of a plurality of receivers of the UE to measure one or more target frequency bands while monitoring a plurality of CCs of a CA configuration, and means for configuring the UE for measurement gaps based at least in part on the indication of the capabilities.

A further apparatus for wireless communication is described. The apparatus may include a processor, memory in electronic communication with the processor, and instructions stored in the memory and operable, when executed by the processor, to cause the apparatus to receive a band-specific measurement gap indication based at least in part on a capability of a plurality of receivers of the UE to measure one or more target frequency bands while monitoring a plurality of CCs of a CA configuration, and configure the UE for measurement gaps based at least in part on the indication of the capabilities.

A non-transitory computer-readable medium storing code for wireless communication is described. The code may include instructions executable to receive a band-specific measurement gap indication based at least in part on a capability of a plurality of receivers of the UE to measure one or more target frequency bands while monitoring a plurality of CCs of a CA configuration, and configure the UE for measurement gaps based at least in part on the indication of the capabilities.

In some examples of the method, apparatuses, or non-transitory computer-readable medium described herein, configuring the UE for measurement gaps comprises selecting a measurement gap pattern from a plurality of patterns based at least in part on a length of measurement gaps in the measurement gap pattern. Additionally or alternatively, some examples may include processes, features, means, or instructions for determining a measurement gap configuration for the plurality of CCs based at least in part on UL interruptions for a corresponding UL configuration, wherein the measurement gaps are configured based at least in part on the determination.

In some examples of the method, apparatuses, or non-transitory computer-readable medium described herein, determining a measurement gap configuration for the plurality of CCs based at least in part on a corresponding UL configuration comprises determining whether the corresponding UL configuration comprises an UL control channel, determining whether UL control information is sent on the UL control channel, or both. Additionally or alternatively, some examples may include processes, features, means, or instructions for determining a measurement gap configuration for the plurality of CCs based at least in part on minimizing downlink (DL) interruptions on the plurality of CCs, wherein the measurement gaps are configured based at least in part on the determination.

Some examples of the method, apparatuses, or non-transitory computer-readable medium described herein may further include processes, features, means, or instructions for determining from the CA configuration a CC having a lowest signal to interference plus noise ratio (SINR) among the plurality of CCs of the CA configuration, or a CC with greater loading than other CCs of CA configuration, or both, wherein the measurement gaps are configured based at least in part on the determination.

A method of wireless communication is described. The method may include determining, in a CA configuration, that at least one first CC with an UL control channel is unavailable based at least in part on a measurement gap configured for a UE, and receiving UL control information on a second CC with an UL control channel during the measurement gap based at least in part on the determination.

An apparatus for wireless communication is described. The apparatus may include means for determining, in a CA configuration, that at least one first CC with an UL control channel is unavailable based at least in part on a measurement gap configured for a UE, and means for receiving UL control information on a second CC with an UL control channel during the measurement gap based at least in part on the determination.

A further apparatus for wireless communication is described. The apparatus may include a processor, memory in electronic communication with the processor, and instructions stored in the memory and operable, when executed by the processor, to cause the apparatus to determine, in a CA configuration, that at least one first CC with an UL control channel is unavailable based at least in part on a measurement gap configured for a UE, and receive UL control information on a second CC with an UL control channel during the measurement gap based at least in part on the determination.

A non-transitory computer-readable medium storing code for wireless communication is described. The code may include instructions executable to determine, in a CA configuration, that at least one first CC with an UL control channel is unavailable based at least in part on a measurement gap configured for a UE, and receive UL control information on a second CC with an UL control channel during the measurement gap based at least in part on the determination.

Some examples of the method, apparatuses, or non-transitory computer-readable medium described herein may further include processes, features, means, or instructions for configuring the UE for measurement gaps, wherein the determination is based at least in part on the measurement gap configuration. Additionally or alternatively, in some examples the second CC is autonomously selected by a UE.

In some examples of the method, apparatuses, or non-transitory computer-readable medium described herein, the second CC is autonomously selected based at least in part on a set of predetermined priorities, network signaling, an RF architecture of the UE, or a combination thereof. Additionally or alternatively, in some examples the UL control information comprises channel state feedback, HARQ feedback, or both.

BRIEF DESCRIPTION OF THE DRAWINGS

Aspects of the disclosure are described in reference to the following figures.

DETAILED DESCRIPTION

Figure 1:
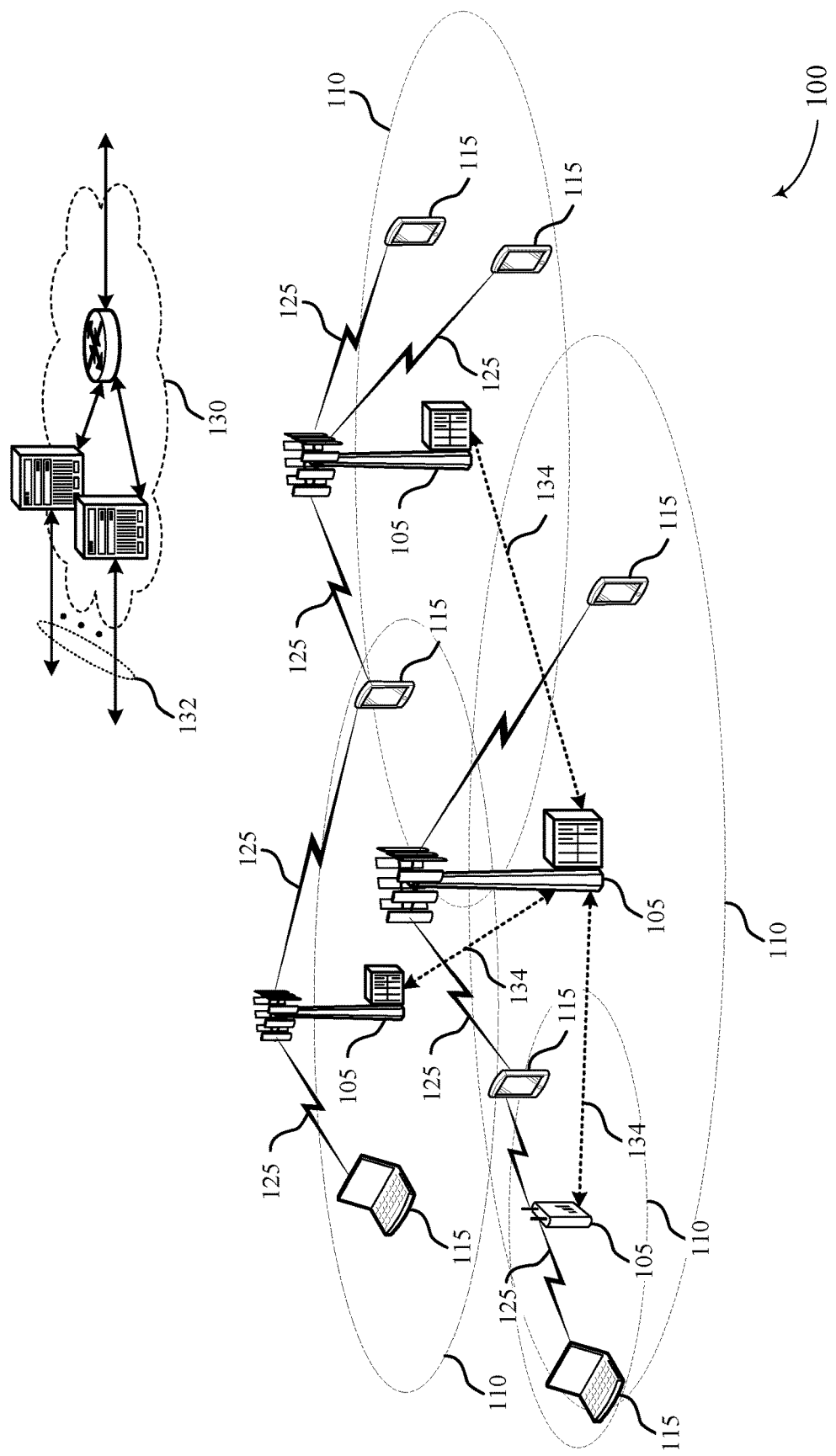
FIG. 1 illustrates an example of a wireless communications system that supports measurement gaps in carrier aggregation in accordance with various aspects of the present disclosure.

In some wireless systems, synchronization signals may be sent between the user equipment (UE) and base stations, which may assist with actions such as cell discovery, signal strength measurements, etc. In order for the UE to maintain connectivity, it may switch to different frequencies to monitor different serving cells (e.g., in places where coverage is different on different frequencies or for load balancing purposes). In some cases, the UE may perform measurements (e.g., to discover cells or measure signal strength) on different frequencies. For this purpose, it may stop monitoring the serving cell and retune to another frequency using measurement gaps.

Carrier aggregation (CA) capable UEs may have multiple receivers that may enable the UE to monitor multiple frequencies at the same time. In some cases, the measurement gaps are common for the aggregated carriers, i.e., occur at the same time for the carriers, and may not be configured independently per component carrier (CC). However, a UE may need one receiver to monitor another serving cell, but to achieve this, the other receivers may be interrupted.

Thus, as described herein, a network may configure measurement gaps on each CC independently. Based on the UE capabilities, the network may pick the right CC or CCs on which to configure the measurement gaps. Reducing the number of carriers that are interrupted may enable the network to use the uninterrupted carriers in order to achieve higher throughput or scheduling flexibility. Furthermore, the network may choose different gap patterns for the individual CCs. This may, for example, have different impacts on the aggregated carriers in terms of interruption time (i.e., reduced scheduling opportunity).

Based on the information received from the UE, the base station may pick which receiver the UE should use for measurements and may configure the measurement gaps for a subset of CCs. In some cases, if the UE supports multiple gap patterns for the measurement of the non-serving frequency, the base station may pick the one with the least impact on the aggregated carriers. The network may also configure the measurement gaps on CCs that have the least impact on downlink (DL) or uplink (UL) communication. In some cases, the base station may configure the measurement gaps based on UE capability and the UE may pick which measurement gap pattern to use.

The base station may also change the UL configuration such that impact on control information may be minimized. For example, the base station may switch UL to a different CC on which there are no gaps. Here, the control information may be sent on a different UL during the measurement gaps when UL is not available on the CC with control information. Also, the UE may autonomously pick which UL channel to send the control data if the default CC used for control information is not available.

Aspects of the disclosure are initially described in the context of a wireless communication system. Specific examples are then described for a specific measurement gap configuration. These and other aspects of the disclosure are further illustrated by and described with reference to apparatus diagrams, system diagrams, and flowcharts that relate to measurement gaps in carrier aggregation.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-a) network. Wireless communications system 100 may illustrate an example of a system in which UEs 115 are configured with measurement gap patterns in which the UE 115 may continue to monitor some CCs while measuring neighboring frequency bands with another receiver.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A communication link 125 may include one or more frequency ranges organized into carriers. A carrier may also be referred to as a CC, a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates.

Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for downlink (DL) may be referred to as a DL CC, and a carrier used for uplink (UL) may be referred to as an UL CC. A UE 115 may be configured with multiple DL component carriers (CCs) and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers.

Each cell of a base station 105 may include an UL component carrier (CC) and a DL CC. The geographic coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/NACK, channel quality indicator (CQI), and scheduling information transmitted on physical uplink control channel (PUCCH), is carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In other cases, one or more SCells may be designated to carry PUCCH, and the SCells may be organized into PUCCH groups based on which CC is used to carry the associated UL control information. Some wireless networks may utilize enhanced CA operations based on a large number of carriers (e.g., between 5 and 32 carriers), operation in unlicensed spectrum, or use of enhanced CCs.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical hybrid automatic repeat request (HARD) indicator channel (PHICH) configuration. After decoding the MIB, the UE 115 may receive one or more system information blocks (SIBs). For example, SIB1 may contain cell access parameters and scheduling information for other Ms. Decoding SIB1 may enable the UE 115 to receive SIB2. SIB2 may contain RRC configuration information related to random access channel (RACH) procedures, paging, PUCCH, physical uplink shared channel (PUSCH), power control, sounding reference signal (SRS), and cell barring.

In some cases, a UE 115 may interrupt communications of one or more CCs to make measurements on target frequency bands. That is, a measurement gap may be introduced to measure the different frequencies of neighbor base stations 105 (including base station 105 using different radio access technologies (RATs) from the current serving cell). In some cases, when a neighboring inter frequency cell has better signal than serving cell, the UE 115 will measure the reference signal received power (RSRP) during the gap and inform the current cell in a measurement report. During this gap the UE 115 may not communicate over the cell configured with the measurement gap. A base station 105 may provide a measurement gap configuration in the scheduling of the UE 115 where no downlink or uplink scheduling occurs. The gap may provide the UE 115 sufficient time to change frequency, make a measurement, and switch back to the active channel. In some cases, the gaps may be several (e.g., 5 or 6) subframes, but in other cases the gaps may be of a reduced time period. In some cases measurement gaps are coordinated with discontinuous reception (sleep) intervals of the UE 115. In some cases, different component carriers may be configured with separate measurement gap configurations (e.g., so that a UE 115 may continue to monitor a CC with one receiver while utilizing another receiver to perform measurements).

In some cases, a base station 105 may provide a UE 115 with a measurement reporting configuration as part of an RRC configuration. The measurement reporting configuration may include parameters related to which neighbor cells and frequencies the UE 115 should measure, criteria for sending measurement reports, intervals for transmission of measurement reports (i.e., measurement gaps), and other related information. In some cases, measurement reports may be triggered by events related to the channel conditions of the serving cells or the neighbor cells. For example, in an LTE system a first report (A1) may be triggered when the serving cell becomes better than a threshold; a second report (A2) when the serving cell becomes worse than a threshold; a third report (A3) when a neighbor cell becomes better than the primary serving cell by an offset value; a fourth report (A4) when a neighbor cell becomes better than a threshold; a fifth report (A5) when the primary serving cell becomes worse than a threshold and a neighbor cell is simultaneously better than another (e.g., higher) threshold; a sixth report (A6) when a neighbor cell becomes better than a secondary serving cell by an offset value; a seventh report (B1) when a neighbor using a different RAT becomes better than a threshold; and an eighth report (B2) when a primary serving cell becomes worse than a threshold and the inter-RAT neighbor becomes better than another threshold. In some cases, the UE 115 may wait for a time interval known as time-to-trigger (TTT) to verify that the trigger condition persists before sending the report. Other reports may be sent periodically instead of being based on a trigger condition (e.g., every two seconds a UE 115 may transmit an indication of a transport block error rate). Such a measurement reporting configuration may be limited to a single gap length and communication on all CCs may be interrupted when the UE performs a gap-driven neighbor cell measurement.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands. In carrier aggregation, a UE 115 may communicate using multiple contiguous or non-contiguous carriers. Thus, in some cases a frequency band may include multiple carriers and in other cases a frequency band may include a single carrier.

HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

A base station 105 may gather channel condition information from a UE 115 in order to efficiently configure and schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as cell-specific reference signals (CRS) or channel state information reference signals (CSI-RS). RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105. In some cases, HARQ feedback and CSI reports may be transmitted on one CC while another CC is interrupted by a measurement gap (e.g., while a different receiver makes measurements on a different CC).

In some cases, wireless communications system 100 may utilize one or more enhanced component carriers (eCCs). An enhanced component carrier (eCC) may be characterized by one or more features including: flexible bandwidth, different transmission time interval (TTIs), and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic TDD operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Thus, a UE 115 may signal a band-specific measurement gap indication based on the capability of a set of receivers to measure neighboring frequency bands while monitoring a set of CCs. The UE 115 may receive a measurement gap configuration for a first CC associated with one or more of the target frequency bands based on the band-specific measurement gap indication. The UE 115 may then perform a measurement on one or more of the target frequency bands according to the measurement gap configuration but may still receive downlink messages and transmit uplink control messages associated with the second CC during gaps configured for the first CC (e.g., using a different receiver). In some examples the measurement gap configuration message includes a set of configuration options and the UE 115 may select the measurement gap configuration for the first CC from the set of available options. In other examples, the measurement gap configuration message may include an indication not to perform measurements on the first CC during a measurement gap.

Figure 2:
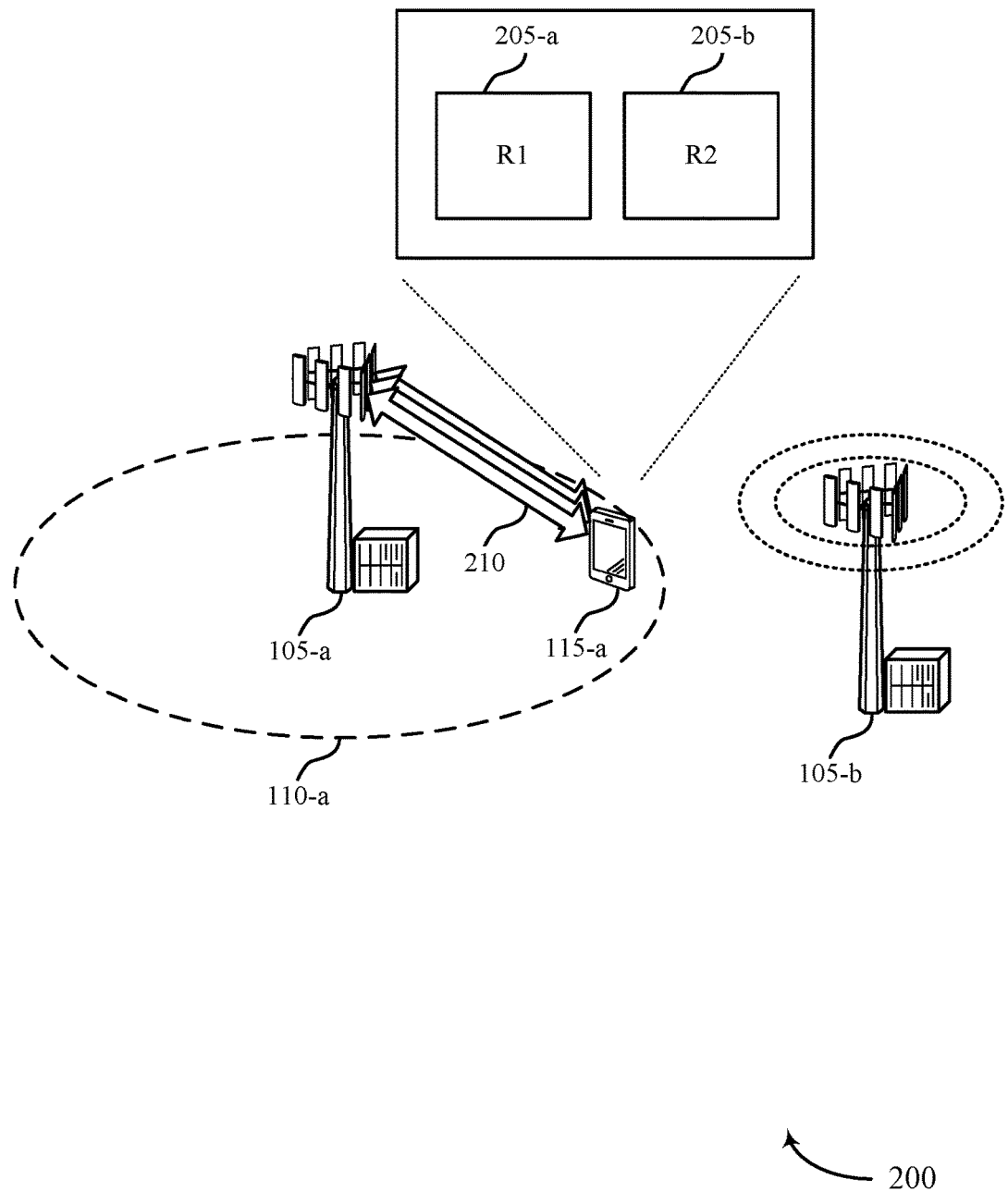
FIG. 2 illustrates an example of a wireless communications subsystem that supports measurement gaps in carrier aggregation in accordance with various aspects of the present disclosure.

FIG. 2 illustrates an example of a wireless communications subsystem 200 for measurement gaps in carrier aggregation in accordance with various aspects of the present disclosure. Wireless communications subsystem 200 may include UE 115-a and base stations 105-a and 105-b, which may be examples of UE 115 and base station 105 described with reference to FIG. 1. UE 115-a may communicate with base station 105-a on multiple CCs 210 using a first receiver 205-a and a second receiver 205-b. UE 115-a may perform measurements one or more cells of base station 105-b during one or more configured measurement gaps using one receiver while continuing to monitor one or more cells of base station 105-a another receiver. In some cases, UE 115-a may also perform measurements on different cells of base station 105-a during the measurement gaps.

Synchronization signals may be transmitted by base stations 105-a and 105-b, which may assist with actions such as cell discovery, signal strength measurements, etc. These synchronization signals may be designed to repeat at regular intervals. For example, synchronization signals may repeat at every 5th subframe (or, every 5 ms for subframes with length 1 ms).

In order for UE 115-a to maintain connectivity, it may switch to different frequencies in order to monitor different cells. UE 115-a may then perform measurements (e.g., to discover cells or measure signal strength) on the different frequencies. For this purpose, it may stop monitoring the serving cell and retune to another frequency using measurement gaps.

UE 115-a may be capable of carrier aggregation (CA) and may have multiple receivers that may enable UE 115-a to monitor multiple frequencies at the same time. In some cases, the measurement gaps are common for all aggregated carriers, i.e., occur at the same time for all carriers, and may not be configured independently per component carrier (CC). For example, UE 115-a may need only one receiver to monitor base station 105-b but all other receivers may be interrupted.

Thus, the network may be able to configure measurement gaps on each CC independently (that is, the gaps may be different for different CCs even if the overall configuration is based on a prioritization involving multiple CCs). For example, based on UE capabilities, the network can pick the optimal CC or CCs on which to configure the measurement gaps while refraining from scheduling gaps for other CCs. This may reduce the number of carriers that are interrupted and may enable the network to use the uninterrupted carriers in order to achieve higher throughput or scheduling flexibility. Furthermore, the network could choose different gap patterns for the individual CCs. This may, for example, have different impacts on the aggregated carriers in terms of interruption time (i.e., reduced scheduling opportunity). For example, a sequence could consist of a 6 ms gap followed by a 34 ms serving cell monitoring (6-34-6-34) or, in another example, a 1 ms gap, 4 ms serving cell monitoring, 1 ms gap, 34 ms serving cell monitoring (1-4-1-34) sequence could be used. In another example of a measurement gap pattern, the measurement gaps may only occur on the downlink (DL) channel, while the uplink (UL) channel remains uninterrupted.

One possible implementation of the present method could entail UE 115-a signaling to the network which receivers can measure which frequency bands while in CA mode. In some cases, UE 115-a may utilize each of its receivers to monitor CCs of the CA configuration. Similarly, UE 115-a may signal which bands of a CA band combination need gaps or interruptions when UE 115-a is measuring a non-serving band.

Table 1 illustrates a possible example. When in a CA configuration with band A+band B+band C, UE 115-a can perform measurements on band D and band E with band A's receiver, band F with band B's receiver, and band G with band C's receiver. One possible way to enable this would be using a bitmap of bands on which it can perform measurements associated with each receiver.

TABLE 1

Example Band-Specific Measurement Gap Bitmap

| | Band A | Band B | Band C | Band D | Band E | Band F | Band G |
|---|---|---|---|---|---|---|---|
| Band A Rx | 1 | 1 | 1 | 1 | 1 | 0 | 0 |
| Band B Rx | 0 | 1 | 0 | 0 | 0 | 1 | 0 |
| Band C Rx | 0 | 0 | 1 | 0 | 0 | 0 | 1 |

In this example, one bit signals that the band would be interrupted if the respective receiver performed a measurement on a different frequency. For example, if a measurement of band E is needed, only band A receiver is able to do such a measurement and it would require the interruption of band A, B, and C. In some cases, the bitmap may reference frequency bands comprising more than one CC. In other cases, the bitmap may reference specific CCs separately.

A similar table may be signaled to the network for each band combination that UE 115-a supports. In some cases, the size of the information transmitted could become large and it may be beneficial to reduce the amount of information transmitted. This reduction may occur in multiple forms. In one possible example, UE 115-a may have two independent receivers that support every band. Here, instead of signaling a bit map for each band that UE 115-a supports per band combination, UE 115-a may indicate which band or bands in the band combination that may be interrupted for the measurement. In another possible example, the CA capability signaling itself can be used to imply which bands need to have the interruptions. In one possible scenario, if UE 115-a supports band 1 and band 2 and it indicates that it does not need gaps to measure band 4, and then if UE 115-a supports band 1+band 2+band 3 and indicates it does need a gap to measure band 4, then base station 105-a can infer that UE 115-a would only need a gap on band 3 for measurements of band 4 when configured with band 1+band 2+band 3.

In some cases, UE 115-a may support different gap patterns. In this case, the UE may signal which combination of bands can support which gap pattern to the network. This may be done by sending the information separately for each gap type or by extending the bitmap to have multiple values, each corresponding to a gap type or combination of gaps.

Based on the information received from UE 115-a, base station 105-a may pick which receiver UE 115-a should use for measurements and may configure the measurement gaps for a subset of CCs. In some cases, if UE 115-a supports multiple gap patterns for the measurement of the non-serving frequency, base station 105-a may pick the one with the least impact on the aggregated carriers. The network may also configure the measurement gaps on CCs that have the least impact on UL or UL control information, e.g., acknowledgment feedback or channel state information (CSI).

According to the current disclosure, UE 115-a may signal network capabilities related to which receiver can be used to perform measurements on which frequency bands. This signaling may be for each CA combination separately, may include multiple gap patterns supported by the UE, and may be done using a bitmap corresponding to the bands supported by the UE.

Base station 105-a may configure the measurement gaps based on UE 115-a capability. For example, base station 105-*a* may pick the CC on which the gap pattern causes the least interruptions. Or base station 105-*a* may choose a configuration based on the impact to the UL. For example, base station 105-*a* may pick a CC that has no UL configured (which may minimize the impact on UL feedback to base station 105-*a* for CCs on which there is no gap), it may pick a CC with UL configured but on which UL control information is not, or it may pick a pattern that maintains UL connectivity (which may be important for a CC on which UL control information is sent). In another case, base station 105-*a* may pick a CC that has a worse receive condition, e.g., a CC with a lower SINR seen by UE 115-*a* or a CC with higher loading).

In some cases, the base station may configure the measurement gaps based on the capability of UE 115-*a*, and UE 115-*a* may pick which measurement gap pattern to use. The choice may be based on some pre-determined priorities. For example, UE 115-*a* may choose the measurement gap configuration that has less interruptions.

Base station 105-*a* may change the UL configuration such that impact on control information may be minimized. For example, base station 105-*a* may switch UL to a different CC on which there are no gaps. Here, the control information may be sent on a different UL during the measurement gaps when UL is not available on the CC with control information. Also, UE 115-*a* may autonomously pick which UL channel to send the control data if the default CC used for control information is not available.

Figure 3:
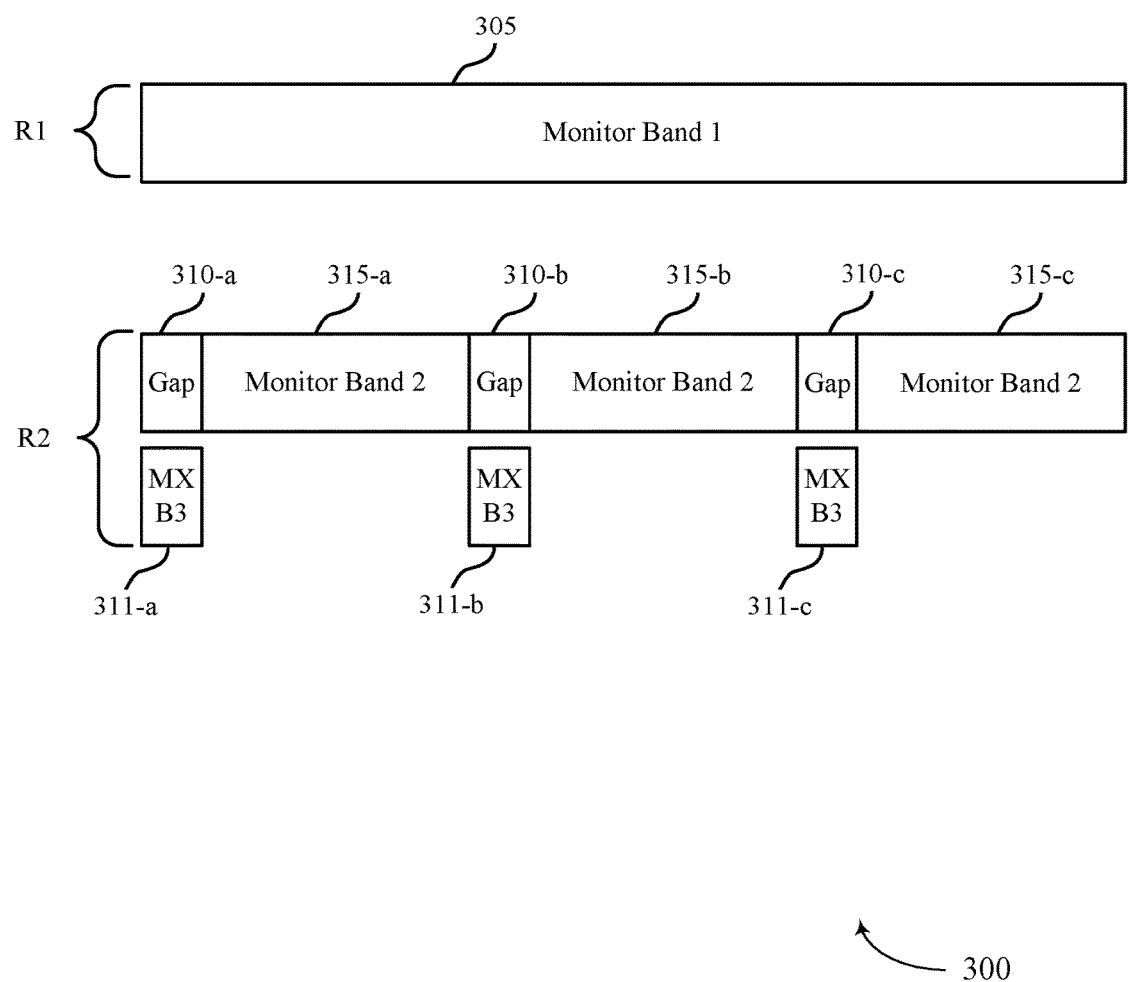
FIG. 3 illustrates an example of a measurement gap configuration that supports measurement gaps in carrier aggregation in accordance with various aspects of the present disclosure.

FIG. 3 illustrates an example of a measurement gap configuration 300 for measurement gaps in carrier aggregation in accordance with various aspects of the present disclosure. Measurement gap configuration 300 may represent a measurement gap configuration for a UE 115 served by a base station 105, which may be examples of a UE 115 and base station 105 described with reference to FIGS. 1-2. Measurement gap configuration 300 represents an example with two serving cells and two receivers, with a configuration for monitoring a third cell with a receiver that is configured to monitor one of the activated CCs. However, different configurations are possible involving more than two CCs and receivers, and more than one neighbor cell to be monitored.

In some cases, the multiple receivers (e.g., the first receiver and the second receiver plus any additional receivers) are each engaged in monitoring at least one CC. Because of this, or due to frequency limitations of the receivers, the UE 115 may not have a free receiver (i.e., a receiver that is not configured to monitor a CC) available to perform measurements without disrupting communications on at least one CC. However, according to the present disclosure, measurement gaps may be configured for at least one of the receivers to enable the UE 115 to tune away from its associated CC in order to perform measurements without configuring measurement gaps for all CCs.

Time period 305 may represent when the first receiver monitors its serving cell on a frequency band (Band 1). Measurement gaps 310-*a*, 310-*b*, and 310-*c* may represent when the second receiver no longer monitors its serving cell on a second frequency band (Band 2). Instead, as time period 311-*a*, 311-*b*, and 311-*c* may represent, the second receiver may monitor a non-serving cell on a third frequency band (Band 3). For example, in order for UE 115 to maintain connectivity, it may switch to different frequencies in order to monitor different serving cells, e.g., in places where coverage is different on different frequencies or for load balancing purposes. UE 115 may perform measurements (e.g., to discover cells or measure signal strength) on different frequencies. For this purpose, it may stop monitoring at least one serving cell and retune to another frequency by using measurement gaps.

Time period 315-*a*, 315-*b*, and 315-*c* may represent when the second receiver returns to monitoring its serving cell on its frequency band (Band 2). For example, after UE 115 exchanges synchronization signals on Band 3 with a non-serving cell, it may return to monitoring its serving cell on Band 2.

Thus, monitoring of Band 1 by the first receiver (time period 305) may be uninterrupted by the second receiver switching bands according to the measurement gap configuration. This may, for example, reduce the number of carriers that are interrupted and may enable the network to use the uninterrupted carriers in order to achieve higher throughput or scheduling flexibility (even if all of the receivers are configured to monitor at least one CC).

The use of the second receiver to monitor a third frequency band without the interruption of the first receiver, and the lengths of the measurement gaps 310-*a*, 311-*a*, and 315-*a* may be represented by a measurement gap configuration. In some cases, the network could choose different gap patterns for the individual CCs. This may, for example, have different impacts on the aggregated carriers in terms of interruption time (i.e., reduced scheduling opportunity). For example, a sequence could consist of a 6 ms gap followed by a 34 ms serving cell monitoring (6-34-6-34). In another example, a 1 ms gap may be followed by 4 ms serving cell monitoring, a 1 ms gap, and 34 ms serving cell monitoring (1-4-1-34). In another example of a measurement gap pattern, the measurement gaps may only occur on the DL channel, while the UL channel remains uninterrupted. In some examples, different measurement gap patterns may be used for different CCs (and thus, different receivers).

Figure 4:
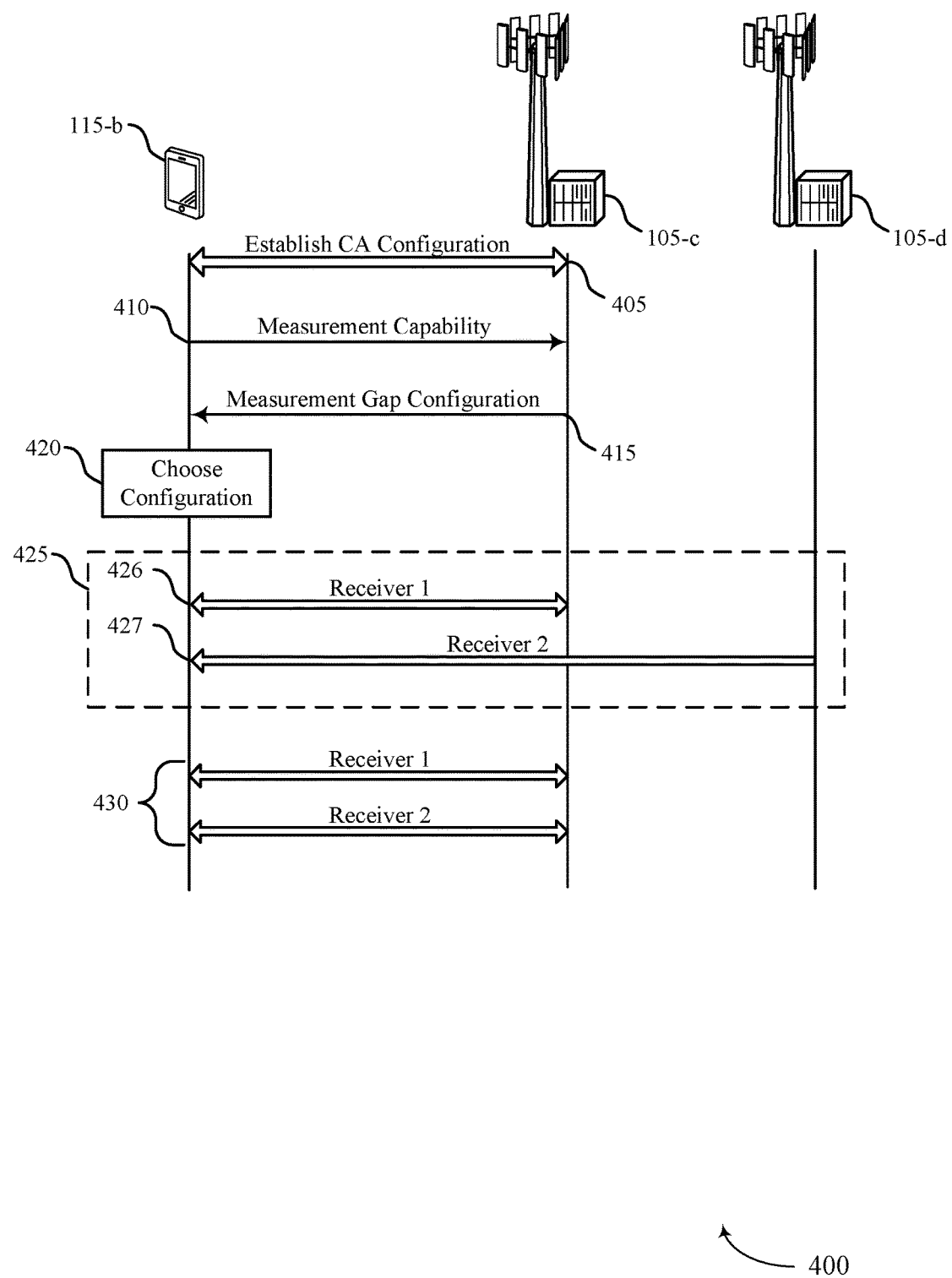
FIG. 4 illustrates an example of a process flow that supports measurement gaps in carrier aggregation in accordance with various aspects of the present disclosure.

FIG. 4 illustrates an example of a process flow 400 for measurement gaps in carrier aggregation in accordance with various aspects of the present disclosure. Process flow 400 may include a UE 115-*b* and base stations 105-*c* and 105-*d*, which may be examples of a UE 115 and base station 105 described with reference to FIGS. 1-2.

At 405, UE 115-*b* and base station 105-*b* may establish a CA configuration with multiple receivers monitoring different frequency bands. At 410, UE 115-*b* may signal a band-specific measurement gap indication to base station 105-*c*. For example, UE 115-*b* may signal a band-specific measurement gap indication based at least in part on a capability of a plurality of receivers to measure one or more target frequency bands while monitoring a plurality of CCs of a CA configuration. In some examples the band-specific measurement gap indication comprises an indication of a subset of the plurality of CCs associated with measuring each of the one or more target frequency bands. In some examples the band-specific measurement gap indication comprises a bitmap associating each of the plurality of CCs with measurement gaps on the one or more target frequency bands. In some cases, UE 115-*b* may signal one or more measurement gap patterns available for use with the CA configuration. In some examples the band-specific measurement gap indication comprises a plurality of supported frequency band measurement gap associations corresponding to a plurality of CA receiver configurations.

At 415, UE 115-*b* may receive a measurement gap configuration message from base station 105-*c*. For example, UE 115-*b* may receive a measurement gap configuration message including a measurement gap configuration for a first CC of the set of CCs associated with a plurality of the target frequency bands, such that the measurement gap configuration may be based on the band-specific measurement gap indication. In some examples the measurement gap configuration message comprises an indication to monitor at least one second CC of the plurality of CCs during at least one gap of the measurement gap configuration for the at least one first CC. In some cases UE 115-*b* may transmit an uplink control message associated with the second CC during the at least one gap. In some cases the measurement gap configuration message comprises a plurality of measurement gap configuration options. In other cases, the measurement gap configuration message may include an indication not to perform measurements on the at least one first CC during a measurement gap.

At 420, UE 115-*b* may select a measurement gap configuration from the received measurement gap configuration message. For example, UE 115-*b* may select the measurement gap configuration for the at least one first CC from the plurality of measurement gap configuration options. In some examples the measurement gap configuration is selected based at least in part on minimizing disruption of monitoring the plurality of CCs, minimizing disruption of UL transmission, or both. In some examples the band-specific measurement gap indication comprises a separate indication based at least in part on the capability of each of the plurality of receivers to measure combinations of the one or more target frequency bands.

At 425, UE 115-*b* may perform a measurement on one or more of the target frequency bands (e.g., of base station 105-*d*) according to the measurement gap configuration. For example, at 426, First receiver continues to monitor base station 105-*c*; whereas at 427, the second receiver switches from monitoring base station 105-*c* to monitoring base station 105-*d*. At 430, the first receiver continues to monitor base station 105-*c* as the second receiver switches back to base station 105-*c* from base station 105-*d*.

In some cases, UE 115-*b* may determine, in a CA configuration, that at least one first CC with an UL control channel is unavailable during a measurement gap. UE 115-*b* may then transmit UL control information on a second CC (with a control channel) during the measurement gap based at least in part on the determination. UE 115-*b* may autonomously select the second CC, such that the UL control information may be transmitted based on the autonomous selection. In some examples the second CC is autonomously selected based at least in part on a set of predetermined priorities, network signaling, an RF architecture of the UE, or a combination thereof. UE 115-*b* may receive a measurement gap configuration, such that determining that the at least one first CC is unavailable is based at least in part on the measurement gap configuration. In some examples the UL control information comprises channel state feedback, HARQ feedback, or both.

Figure 5:
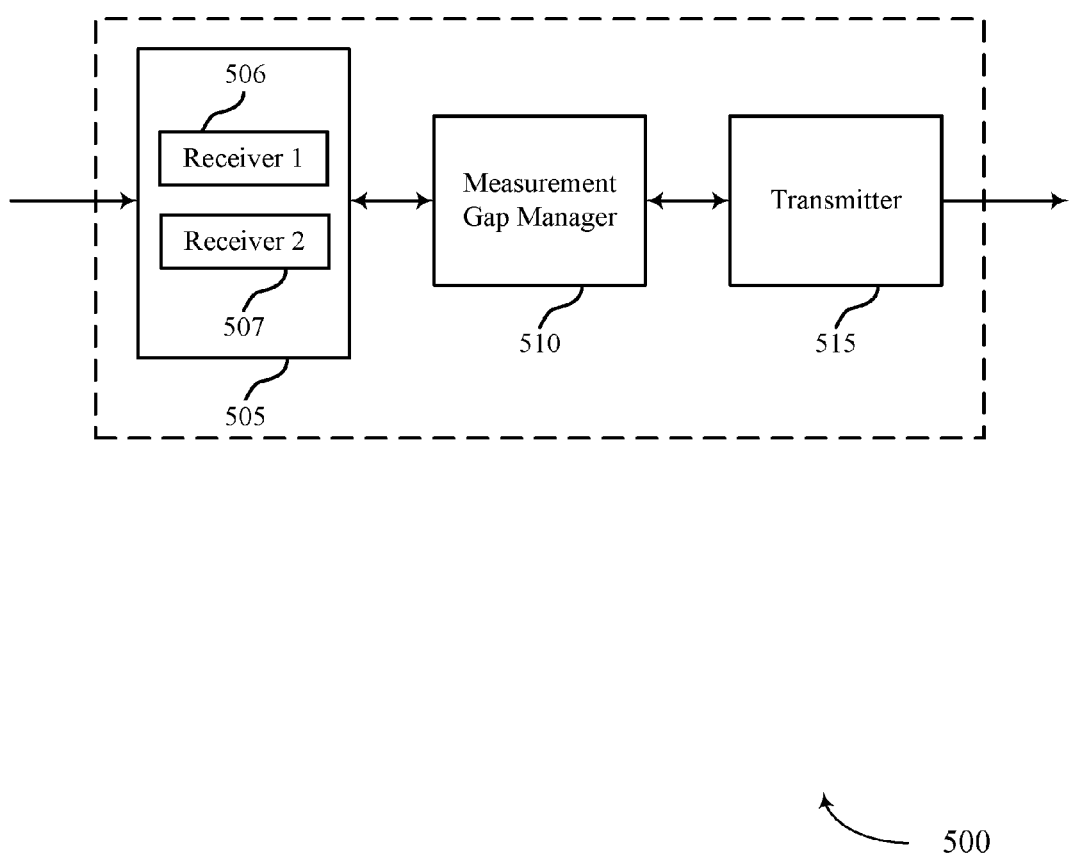
FIGS. 5-7 show block diagrams of a wireless device that supports measurement gaps in carrier aggregation in accordance with various aspects of the present disclosure.

FIG. 5 shows a block diagram of a wireless device 500 configured for measurement gaps in carrier aggregation in accordance with various aspects of the present disclosure. Wireless device 500 may be an example of aspects of a UE 115 described with reference to FIGS. 1-4. Wireless device 500 may include a receiver with multiple receivers 506 and 507, a measurement gap manager 510, or a transmitter 515. Wireless device 500 may also include a processor. Each of these components may be in communication with each other.

The receiver 505 may receive information such as packets, user data, or control information associated with various information channels (e.g., control channels, data channels, and information related to measurement gaps in carrier aggregation, etc.). Information may be passed on to the measurement gap manager 510, and to other components of wireless device 500.

The measurement gap manager 510 may signal a band-specific measurement gap indication based at least in part on a capability of a plurality of receivers to measure one or more target frequency bands while monitoring a plurality of CCs of a CA configuration, and receive a measurement gap configuration message comprising a measurement gap configuration for at least one first CC of the plurality of CCs associated with at least one of the target frequency bands, such that the measurement gap configuration is based at least in part on the band-specific measurement gap indication. In some cases, the measurement gap configuration message provides one or more gaps during which monitoring the at least one first CC can be interrupted for measuring the at least one of the target frequency bands.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
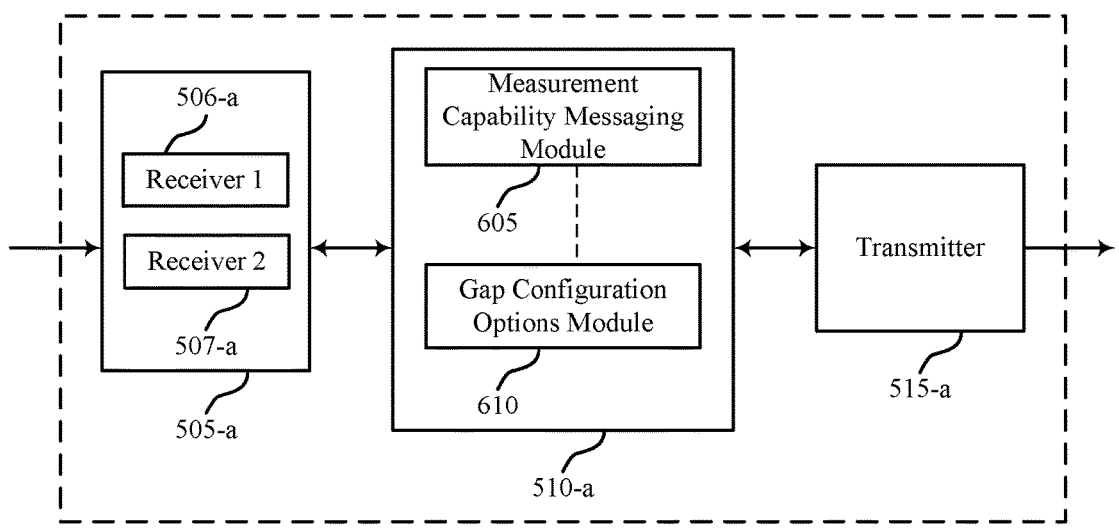

FIG. 6 shows a block diagram of a wireless device 600 for measurement gaps in carrier aggregation in accordance with various aspects of the present disclosure. Wireless device 600 may be an example of aspects of a wireless device 500 or a UE 115 described with reference to FIGS. 1-5. Wireless device 600 may include a receiver 505-*a*, a measurement gap manager 510-*a*, and/or a transmitter 515-*a*. Wireless device 600 may also include a processor. Each of these components may be in communication with each other. The measurement gap manager 510-*a* may also include a measurement capability messaging module 605 and a gap configuration options module 610.

The receiver 505-*a* may receive information which may be passed on to measurement gap manager 510-*a*, and to other components of wireless device 600. The measurement gap manager 510-*a* may perform the operations described with reference to FIG. 5. The transmitter 515-*a* may transmit signals received from other components of wireless device 600.

The measurement capability messaging module 605 may signal a band-specific measurement gap indication based at least in part on a capability of a plurality of receivers to measure one or more target frequency bands while monitoring a plurality of CCs of a CA configuration as described with reference to FIGS. 2-4.

The gap configuration options module 610 may receive a measurement gap configuration message comprising a measurement gap configuration for at least one first CC of the plurality of CCs associated with at least one of the target frequency bands, such that the measurement gap configuration is based at least in part on the band-specific measurement gap indication as described with reference to FIGS. 2-4. In some cases, the measurement gap configuration message provides one or more gaps during which monitoring the at least one first CC can be interrupted for measuring the at least one of the target frequency bands. In some examples, the measurement gap configuration message comprises an indication to monitor at least one second CC of the plurality of CCs during at least one gap of the measurement gap configuration for the at least one first CC. In some examples, the band-specific measurement gap indication comprises an indication of a subset of the plurality of CCs associated with measuring each of the one or more target frequency bands.

The gap configuration options module 610 may also signal one or more measurement gap patterns available for use with the CA configuration. In some examples, the band-specific measurement gap indication comprises a plurality of supported frequency band measurement gap associations corresponding to a plurality of CA receiver configurations. In some examples, the measurement gap configuration message comprises a plurality of measurement gap configuration options. In some examples, the band-specific measurement gap indication comprises a separate indication based at least in part on the capability of each of the plurality of receivers to measure combinations of the one or more target frequency bands. The gap configuration options module 610 may also receive a measurement gap configuration, such that determining that the at least one first CC is unavailable is based at least in part on the measurement gap configuration.

Figure 7:
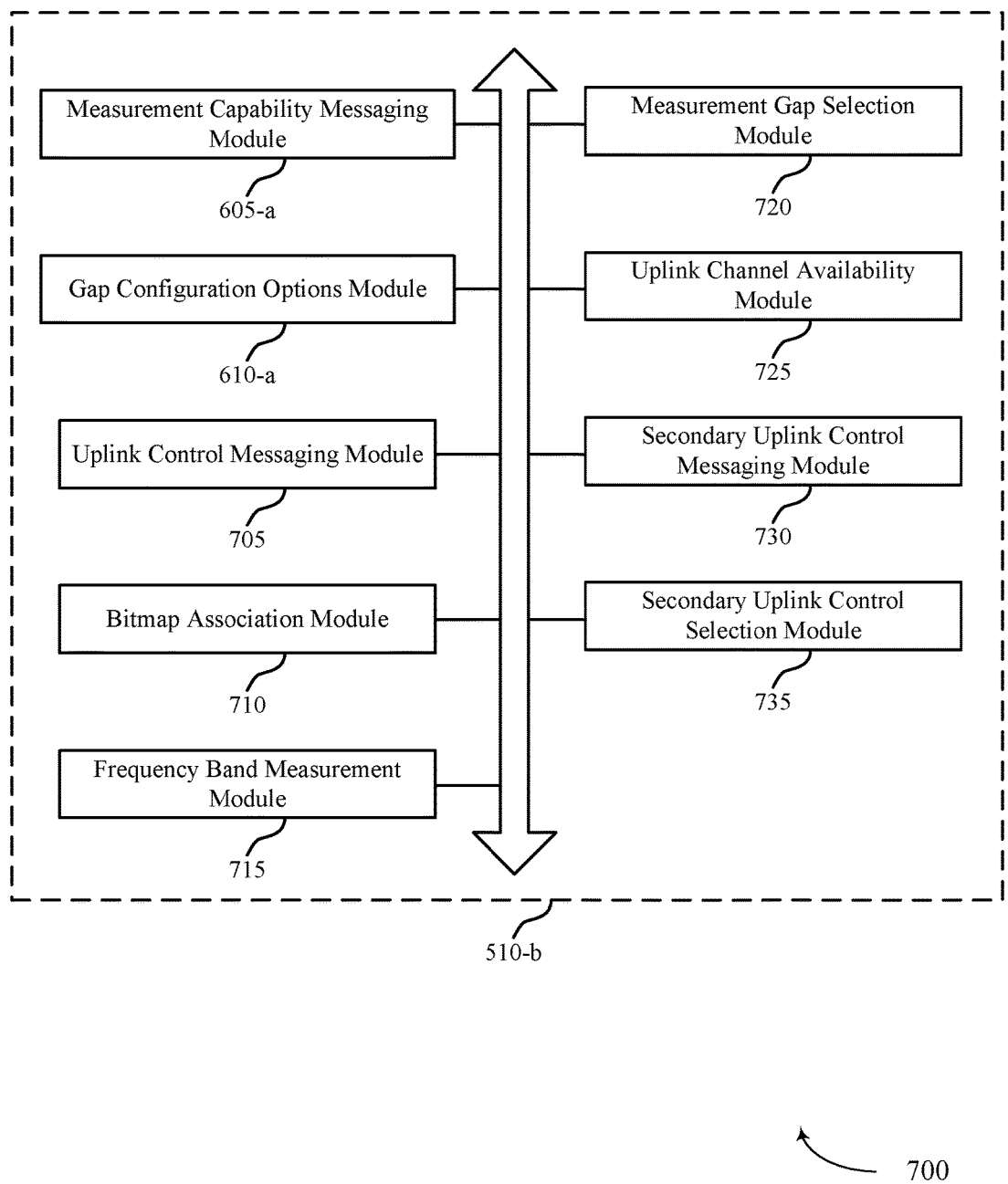

FIG. 7 shows a block diagram 700 of a measurement gap manager 510-*b* which may be a component of a wireless device 500 or a wireless device 600 for measurement gaps in carrier aggregation in accordance with various aspects of the present disclosure. The measurement gap manager 510-*b* may be an example of aspects of a measurement gap manager 510 described with reference to FIGS. 5-6. The measurement gap manager 510-*b* may include a measurement capability messaging module 605-*a*, and a gap configuration options module 610-*a*. Each of these modules may perform the functions described with reference to FIG. 6. The measurement gap manager 510-*b* may also include an uplink control messaging module 705, a bitmap association module 710, a frequency band measurement module 715, a measurement gap selection module 720, an uplink channel availability module 725, a secondary uplink control messaging module 730, and a secondary uplink control selection module 735.

The uplink control messaging module 705 may transmit an uplink control message associated with the second CC during the at least one gap as described with reference to FIGS. 2-4.

The bitmap association module 710 may generate a bitmap associating each of the plurality of CCs with measurement gaps on the one or more target frequency bands. In some cases, the band-specific measurement gap indication may include the bitmap as described with reference to FIGS. 2-4.

The frequency band measurement module 715 may perform a measurement on one or more of the target frequency bands according to the measurement gap configuration as described with reference to FIGS. 2-4.

The measurement gap selection module 720 may select the measurement gap configuration for the at least one first CC from the plurality of measurement gap configuration options as described with reference to FIGS. 2-4. In some examples, the measurement gap configuration may be selected based at least in part on minimizing disruption of monitoring the plurality of CCs, minimizing disruption of UL transmission, or both.

The uplink channel availability module 725 may determine, in a CA configuration, that at least one first CC with an UL control channel is unavailable during a measurement gap as described with reference to FIGS. 2-4.

The secondary uplink control messaging module 730 may transmit UL control information on a second CC with a control channel during the measurement gap based at least in part on the determination as described with reference to FIGS. 2-4. In some examples, the UL control information comprises channel state feedback, HARQ feedback, or both.

The secondary uplink control selection module 735 may autonomously select the second CC, such that the UL control information is transmitted based at least in part on the autonomous selection as described with reference to FIGS. 2-4. In some examples, the second CC may be autonomously selected based at least in part on a set of predetermined priorities, network signaling, an RF architecture of the UE, or a combination thereof.

Figure 8:
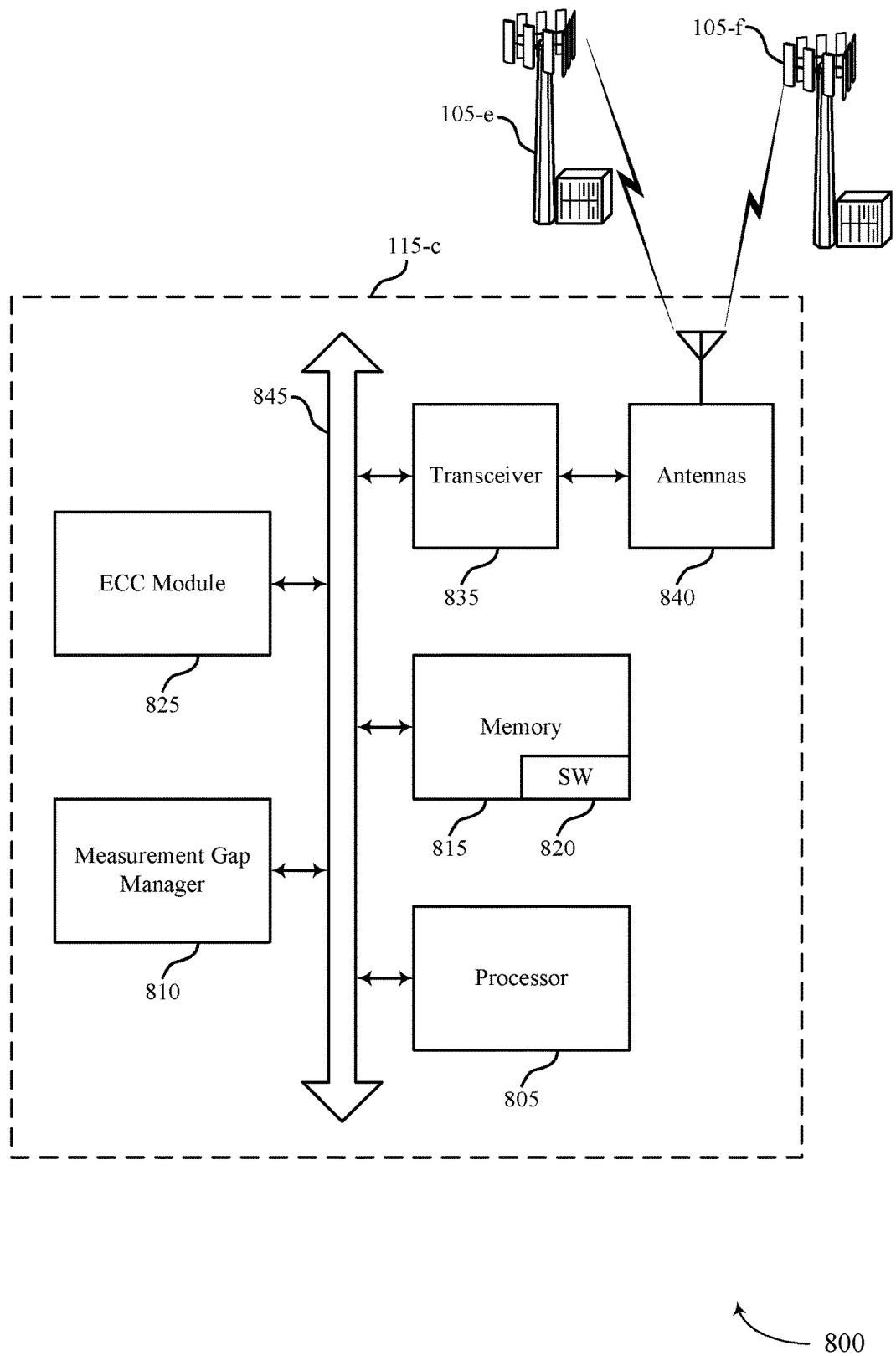
FIG. 8 illustrates a block diagram of a system including a user equipment (UE) that supports measurement gaps in carrier aggregation in accordance with various aspects of the present disclosure.

FIG. 8 shows a diagram of a system 800 including a UE 115 configured for measurement gaps in carrier aggregation in accordance with various aspects of the present disclosure. System 800 may include UE 115-*c*, which may be an example of a wireless device 500, a wireless device 600, or a UE 115 described with reference to FIGS. 1, 2 and 5-7. UE 115-*c* may include a measurement gap manager 810, which may be an example of a measurement gap manager 510 described with reference to FIGS. 5-7. UE 115-*c* may also include a ECC module 825. UE 115-*c* may also include components for bi-directional voice and data communications including components for transmitting communications and components for receiving communications. For example, UE 115-*c* may communicate bi-directionally with base station 105-*e* or base station 105-*d* (e.g., either to communicate or to perform measurements)

ECC module 825 may enable communications using a large number of CCs, reduced or variable TTIs, or modified control channels as described with reference to FIG. 1.

UE 115-*c* may also include a processor 805, and memory 815 (including software) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*c* may include a single antenna 840, UE 115-*c* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., measurement gaps in carrier aggregation, etc.). Alternatively, the software/firmware code 820 may not be directly executable by the processor 805 but cause a computer (e.g., when compiled and executed) to perform functions described herein. The processor 805 may include an intelligent hardware device (e.g., a central processing unit (CPU), a microcontroller, an application specific integrated circuit (ASIC), etc.)

Figure 9:
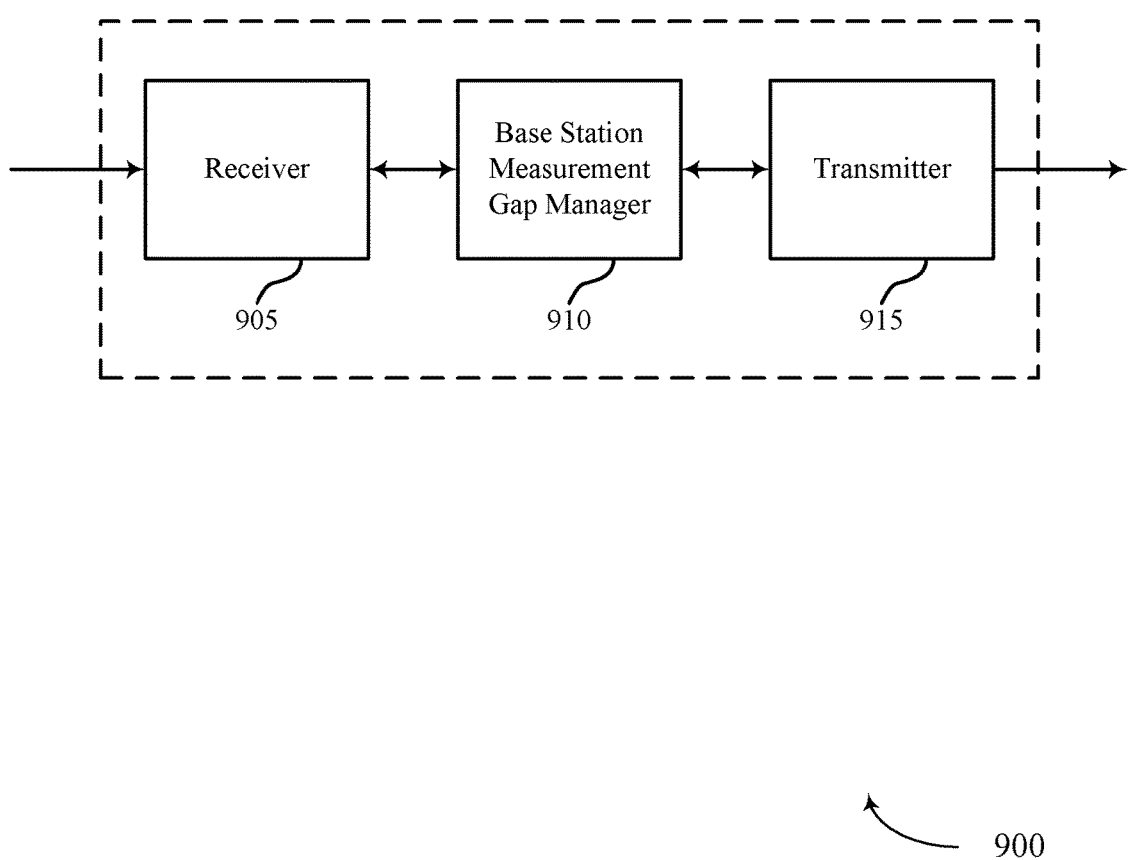
FIGS. 9-11 show block diagrams of a wireless device that supports measurement gaps in carrier aggregation in accordance with various aspects of the present disclosure.

FIG. 9 shows a block diagram of a wireless device 900 configured for measurement gaps in carrier aggregation in accordance with various aspects of the present disclosure. Wireless device 900 may be an example of aspects of a base station 105 described with reference to FIGS. 1-8. Wireless device 900 may include a receiver 905, a base station measurement gap manager 910, and/or a transmitter 915. Wireless device 900 may also include a processor. Each of these components may be in communication with each other.

The receiver 905 may receive information such as packets, user data, or control information associated with various information channels (e.g., control channels, data channels, and information related to measurement gaps in carrier aggregation, etc.). Information may be passed on to the base station measurement gap manager 910, and to other components of wireless device 900.

The base station measurement gap manager 910 may receive a band-specific measurement gap indication based at least in part on a capability of a plurality of receivers of the UE to measure one or more target frequency bands while monitoring a plurality of CCs of a CA configuration, and configure the UE for measurement gaps based at least in part on the band-specific measurement gap indication.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
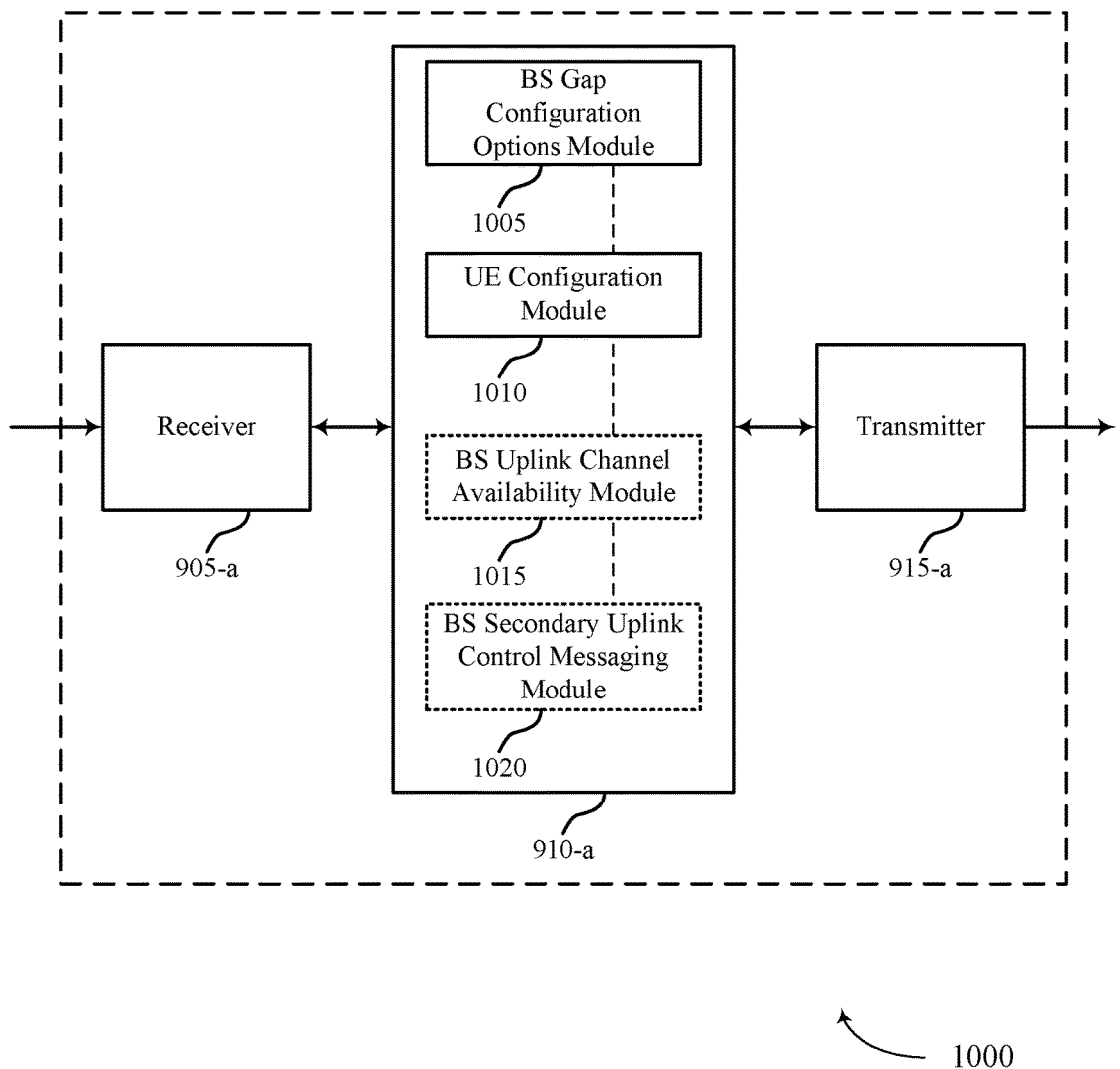

FIG. 10 shows a block diagram of a wireless device 1000 for measurement gaps in carrier aggregation in accordance with various aspects of the present disclosure. Wireless device 1000 may be an example of aspects of a wireless device 900 or a base station 105 described with reference to FIGS. 1-9. Wireless device 1000 may include a receiver 905-*a*, a base station measurement gap manager 910-*a*, and/or a transmitter 915-*a*. Wireless device 1000 may also include a processor. Each of these components may be in communication with each other. The base station measurement gap manager 910-*a* may also include a base station (BS) gap configuration options module 1005, a UE configuration module 1010, a BS uplink channel availability module 1015, and a BS secondary uplink control messaging module 1020.

The receiver 905-*a* may receive information which may be passed on to base station measurement gap manager 910-*a*, and to other components of wireless device 1000. The base station measurement gap manager 910-*a* may perform the operations described with reference to FIG. 9. The transmitter 915-*a* may transmit signals received from other components of wireless device 1000.

The BS gap configuration options module 1005 may receive a band-specific measurement gap indication based at least in part on a capability of a plurality of receivers of a UE to measure one or more target frequency bands while monitoring a plurality of CCs of a CA configuration as described with reference to FIGS. 2-4.

The UE configuration module 1010 may configure the UE for measurement gaps based at least in part on the band-specific measurement gap indication as described with reference to FIGS. 2-4. In some examples, configuring the UE for measurement gaps comprises selecting a measurement gap pattern from a plurality of patterns based at least in part on a length of measurement gaps in the measurement gap pattern. The UE configuration module 1010 may also configure the UE for measurement gaps, such that the determination is based at least in part on the measurement gap configuration.

The BS uplink channel availability module 1015 may determine, in a CA configuration, that at least one first CC with an UL control channel is unavailable based at least in part on a measurement gap configured for a UE as described with reference to FIGS. 2-4.

The BS secondary uplink control messaging module 1020 may receive, from the UE, UL control information on a second CC with an UL control channel during the measurement gap based at least in part on the determination as described with reference to FIGS. 2-4.

Figure 11:
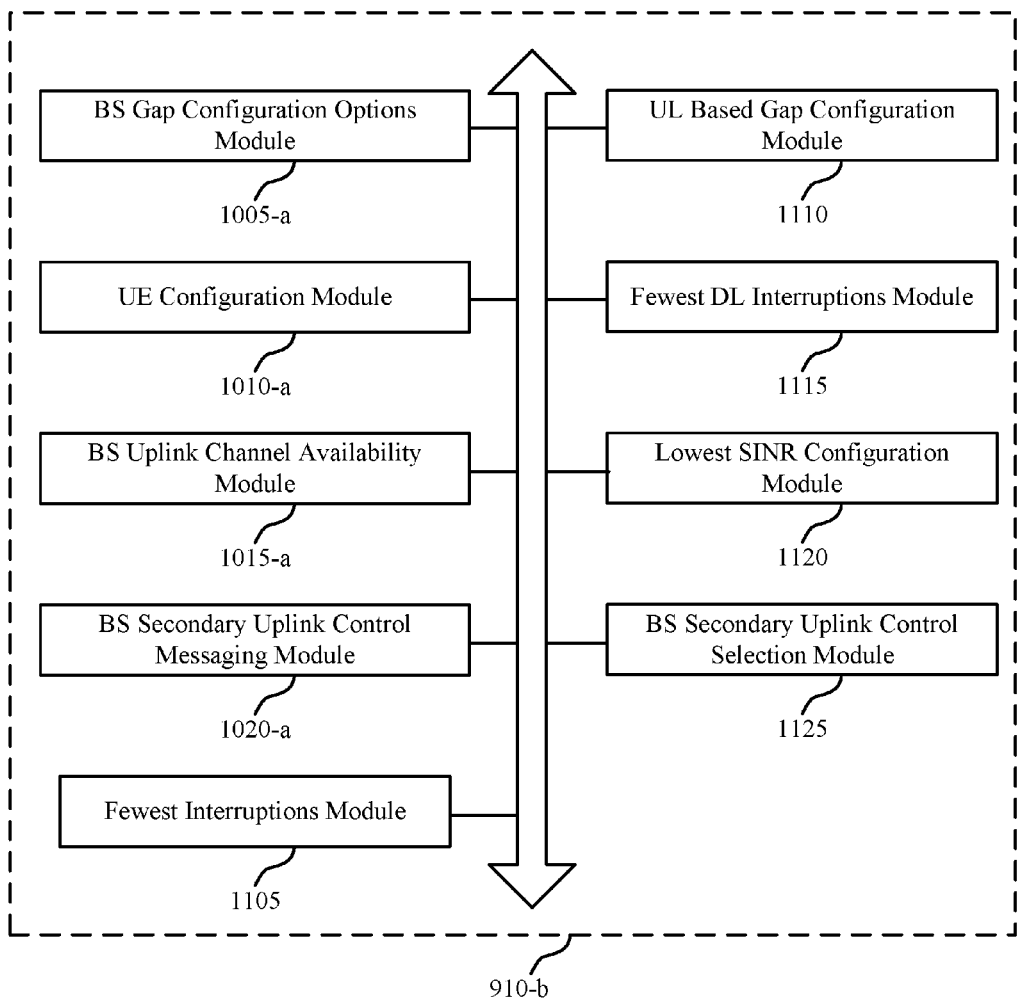

FIG. 11 shows a block diagram 1100 of a base station measurement gap manager 910-*b* which may be a component of a wireless device 900 or a wireless device 1000 for measurement gaps in carrier aggregation in accordance with various aspects of the present disclosure. The base station measurement gap manager 910-*b* may be an example of aspects of a base station measurement gap manager 910 described with reference to FIGS. 9-10. The base station measurement gap manager 910-*b* may include a BS gap configuration options module 1005-*a*, a UE configuration module 1010-*a*, a BS uplink channel availability module 1015-*a*, and a BS secondary uplink control messaging module 1020-*a*. Each of these modules may perform the functions described with reference to FIG. 10. The base station measurement gap manager 910-*b* may also include a fewest interruptions module 1105, a UL based gap configuration module 1110, a fewest DL interruptions module 1115, a lowest SINR configuration module 1120, and a BS secondary uplink control selection module 1125.

The fewest interruptions module 1105 may determine a measurement gap configuration for the plurality of CCs based at least in part on UL interruptions for a corresponding UL configuration, such that the measurement gaps are configured based at least in part on the determination as described with reference to FIGS. 2-4.

The UL based gap configuration module 1110 may be configured such that determining a measurement gap configuration for the plurality of CCs based at least in part on a corresponding UL configuration may include determining whether the corresponding UL configuration may include an UL control channel, determining whether UL control information may be sent on the UL control channel, or both as described with reference to FIGS. 2-4.

The fewest DL interruptions module 1115 may determine a measurement gap configuration for the plurality of CCs based at least in part on minimizing DL interruptions on the plurality of CCs, such that the measurement gaps are configured based at least in part on the determination as described with reference to FIGS. 2-4.

The lowest SINR configuration module 1120 may determine from the CA configuration a CC having a lowest SINR among the plurality of CCs of the CA configuration, or a CC with greater loading than other CCs of CA configuration, or both, such that the measurement gaps are configured based at least in part on the determination as described with reference to FIGS. 2-4.

The BS secondary uplink control selection module 1125 may be configured such that the second CC may be autonomously selected by a UE as described with reference to FIGS. 2-4.

Figure 12:
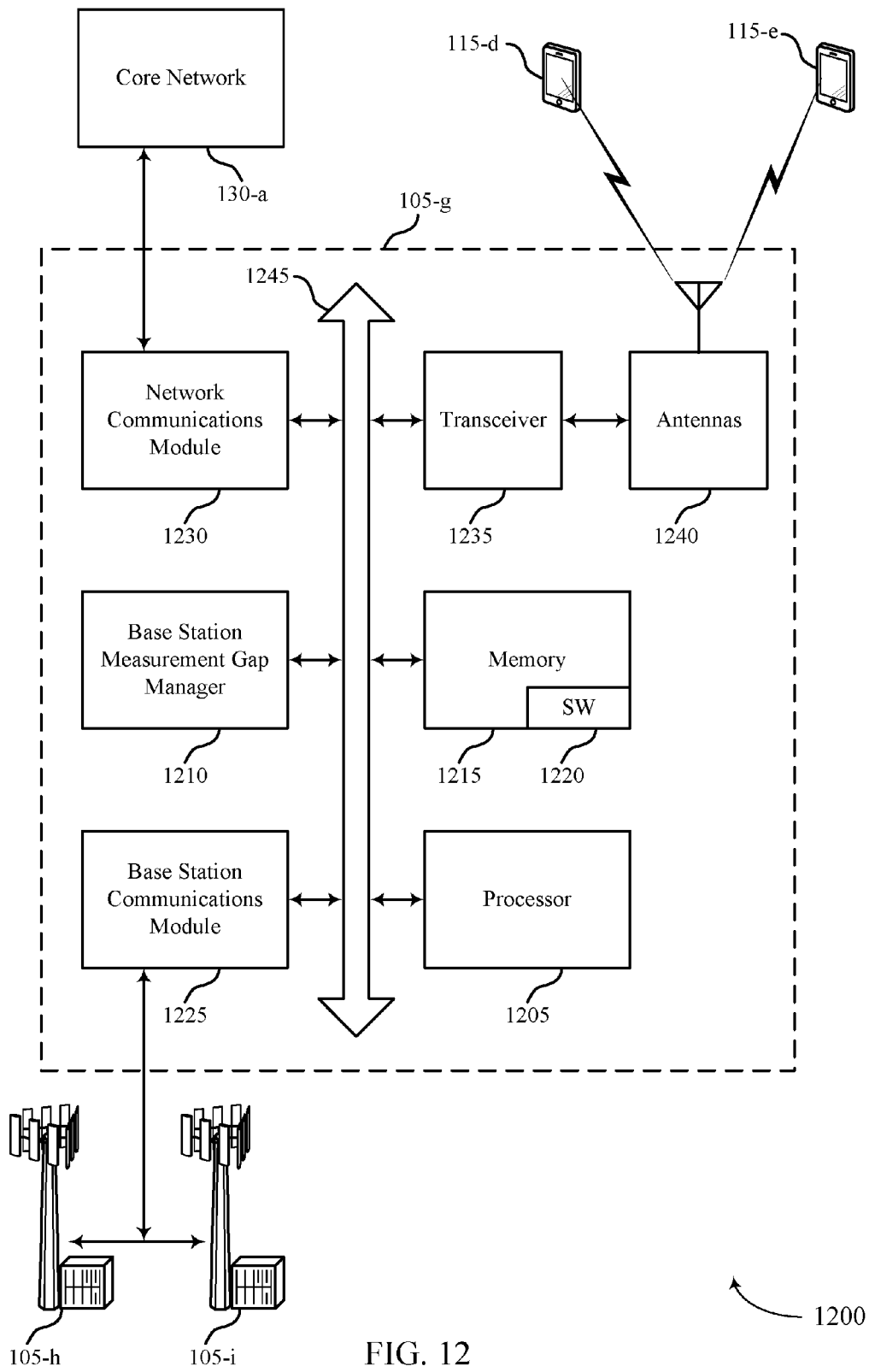
FIG. 12 illustrates a block diagram of a system including a base station that supports measurement gaps in carrier aggregation in accordance with various aspects of the present disclosure.

FIG. 12 shows a diagram of a system 1200 including a base station 105 configured for measurement gaps in carrier aggregation in accordance with various aspects of the present disclosure. System 1200 may include base station 105-*g*, which may be an example of a wireless device 900, a wireless device 1000, or a base station 105 described with reference to FIGS. 1, 2 and 9-11. Base station 105-*g* may include a base station measurement gap manager 1210, which may be an example of a base station measurement gap manager 910 described with reference to FIGS. 9-11. Base station 105-*g* may also include components for bi-directional voice and data communications including components for transmitting communications and components for receiving communications. For example, base station 105-*g* may communicate bi-directionally with UE 115-*d* or UE 115-*e*.

In some cases, base station 105-*g* may have one or more wired backhaul links. Base station 105-*g* may have a wired backhaul link (e.g., S1 interface, etc.) to the core network 130. Base station 105-*g* may also communicate with other base stations 105, such as base station 105-*h* and base station 105-*i* via inter-base station backhaul links (e.g., an X2 interface). Each of the base stations 105 may communicate with UEs 115 using the same or different wireless communications technologies. In some cases, base station 105-*g* may communicate with other base stations such as 105-*h* or 105-*i* utilizing base station communications module 1225. In some examples, base station communications module 1225 may provide an X2 interface within an LTE/LTE-A wireless communication network technology to provide communication between some of the base stations 105. In some examples, base station 105-*g* may communicate with other base stations through core network 130. In some cases, base station 105-*g* may communicate with the core network 130 through network communications module 1230.

The base station 105-*g* may include a processor 1205, memory 1215 (including software 1220), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115, which may be multi-mode devices. The transceiver 1235 (or other components of the base station 105-*g*) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-*g* may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., measurement gaps in carrier aggregation, selecting coverage enhancement techniques, call processing, database management, message routing, etc.). Alternatively, the software 1220 may not be directly executable by the processor 1205 but be configured to cause the computer, e.g., when compiled and executed, to perform functions described herein. The processor 1205 may include an intelligent hardware device (e.g., a CPU, a microcontroller, an ASIC, etc.). The processor 1205 may include various special purpose processors such as encoders, queue processing modules, base band processors, radio head controllers, digital signal processor (DSPs), and the like.

The base station communications module 1225 may manage communications with other base stations 105. In some cases, a communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

The components of wireless device 500, wireless device 600, and measurement gap manager 510, system 800, wireless device 900, wireless device 1000, base station measurement gap manager 910, and system 1200 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
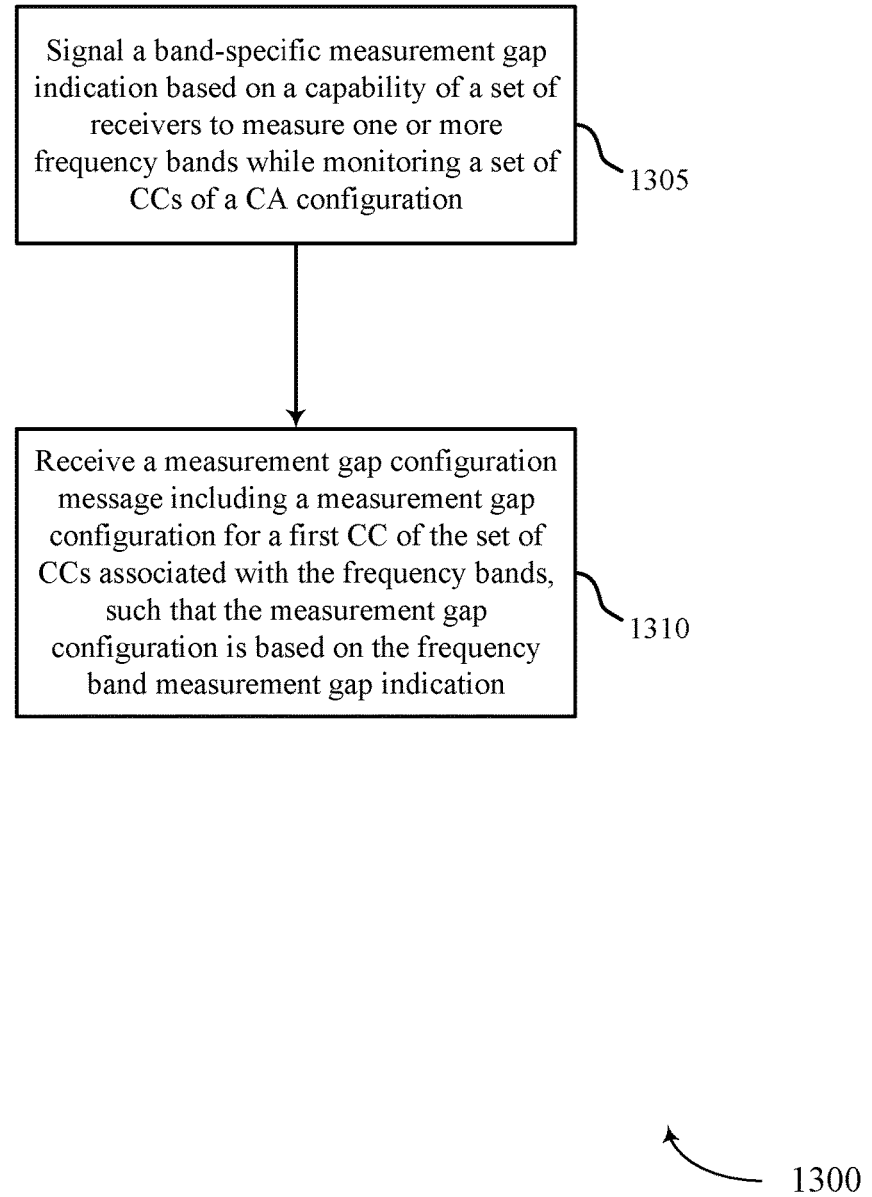
FIGS. 13-20 illustrate methods for measurement gaps in carrier aggregation in accordance with various aspects of the present disclosure.

FIG. 13 shows a flowchart illustrating a method 1300 for measurement gaps in carrier aggregation in accordance with various aspects of the present disclosure. The operations of method 1300 may be implemented by a UE 115 or its components as described with reference to FIGS. 1-12. For example, the operations of method 1300 may be performed by the measurement gap manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware.

At block 1305, the UE 115 may signal a band-specific measurement gap indication based at least in part on a capability of a plurality of receivers to measure one or more target frequency bands while monitoring a plurality of CCs of a CA configuration as described with reference to FIGS. 2-4. In certain examples, the operations of block 1305 may be performed by the measurement capability messaging module 605 as described with reference to FIG. 6.

At block 1310, the UE 115 may receive a measurement gap configuration message comprising a measurement gap configuration for at least one first CC of the plurality of CCs associated with at least one of the target frequency bands, such that the measurement gap configuration is based at least in part on the band-specific measurement gap indication as described with reference to FIGS. 2-4. In certain examples, the operations of block 1310 may be performed by the gap configuration options module 610 as described with reference to FIG. 6.

Figure 14:
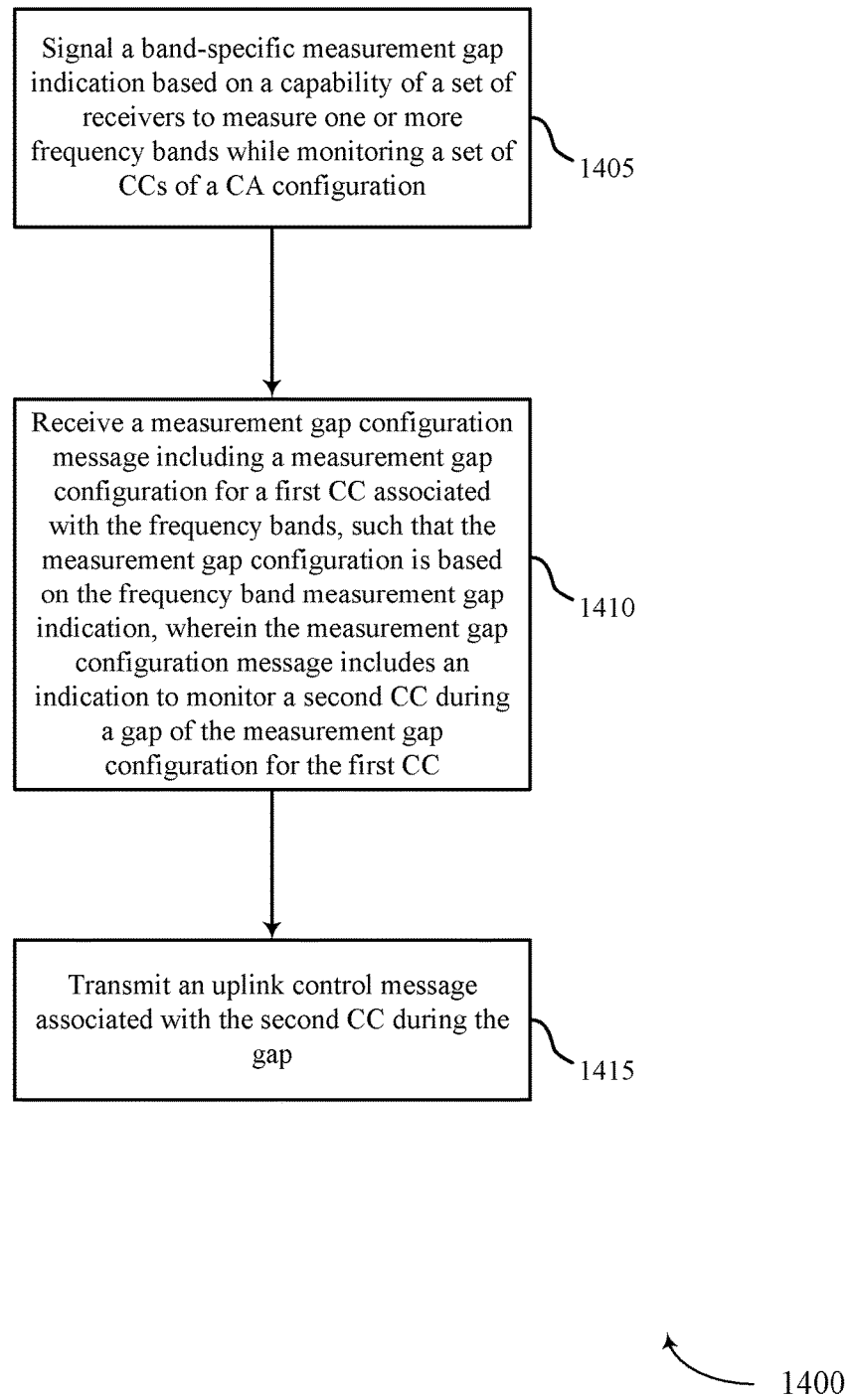

FIG. 14 shows a flowchart illustrating a method 1400 for measurement gaps in carrier aggregation in accordance with various aspects of the present disclosure. The operations of method 1400 may be implemented by a UE 115 or its components as described with reference to FIGS. 1-12. For example, the operations of method 1400 may be performed by the measurement gap manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1400 may also incorporate aspects of method 1300 of FIG. 13.

At block 1405, the UE 115 may signal a band-specific measurement gap indication based at least in part on a capability of a plurality of receivers to measure one or more target frequency bands while monitoring a plurality of CCs of a CA configuration as described with reference to FIGS. 2-4. In certain examples, the operations of block 1405 may be performed by the measurement capability messaging module 605 as described with reference to FIG. 6.

At block 1410, the UE 115 may receive a measurement gap configuration message comprising a measurement gap configuration for at least one first CC of the plurality of CCs associated with at least one of the target frequency bands, such that the measurement gap configuration is based at least in part on the band-specific measurement gap indication as described with reference to FIGS. 2-4. In some cases, the measurement gap configuration message provides one or more gaps during which monitoring the at least one first CC can be interrupted for measuring the at least one of the target frequency bands. In some cases, the measurement gap configuration message comprises an indication to monitor at least one second CC of the plurality of CCs during at least one gap of the measurement gap configuration for the at least one first CC. In certain examples, the operations of block 1410 may be performed by the gap configuration options module 610 as described with reference to FIG. 6.

At block 1415, the UE 115 may transmit an uplink control message associated with the second CC during the at least one gap as described with reference to FIGS. 2-4. In certain examples, the operations of block 1415 may be performed by the uplink control messaging module 705 as described with reference to FIG. 7.

Figure 15:
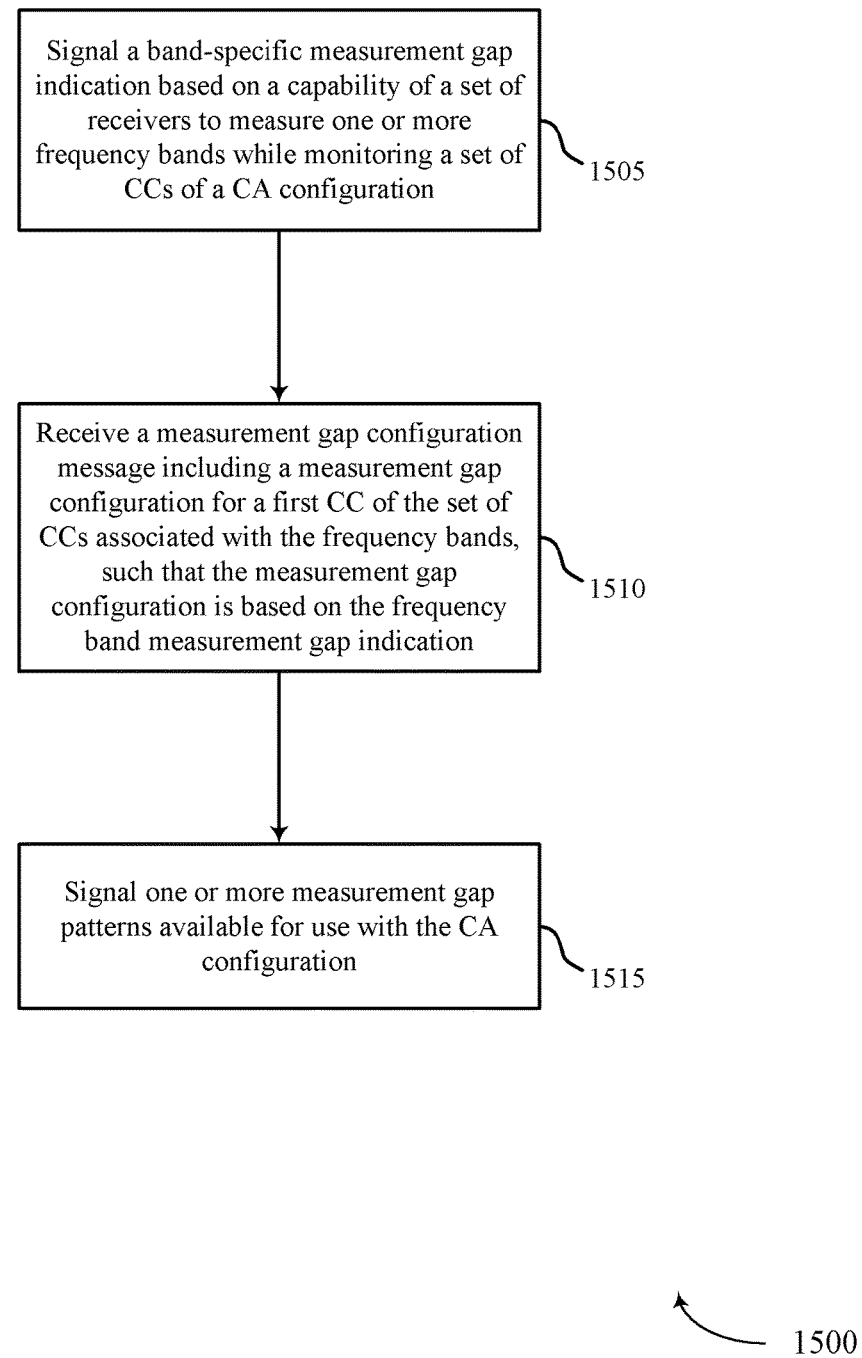

FIG. 15 shows a flowchart illustrating a method 1500 for measurement gaps in carrier aggregation in accordance with various aspects of the present disclosure. The operations of method 1500 may be implemented by a UE 115 or its components as described with reference to FIGS. 1-12. For example, the operations of method 1500 may be performed by the measurement gap manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1500 may also incorporate aspects of methods 1300, and 1400 of FIGS. 13-14.

At block 1505, the UE 115 may signal a band-specific measurement gap indication based at least in part on a capability of a plurality of receivers to measure one or more target frequency bands while monitoring a plurality of CCs of a CA configuration as described with reference to FIGS. 2-4. In certain examples, the operations of block 1505 may be performed by the measurement capability messaging module 605 as described with reference to FIG. 6.

At block 1510, the UE 115 may receive a measurement gap configuration message comprising a measurement gap configuration for at least one first CC of the plurality of CCs associated with at least one of the target frequency bands, such that the measurement gap configuration is based at least in part on the band-specific measurement gap indication as described with reference to FIGS. 2-4. In certain examples, the operations of block 1510 may be performed by the gap configuration options module 610 as described with reference to FIG. 6.

At block 1515, the UE 115 may signal one or more measurement gap patterns available for use with the CA configuration as described with reference to FIGS. 2-4. In certain examples, the operations of block 1515 may be performed by the gap configuration options module 610 as described with reference to FIG. 6.

Figure 16:
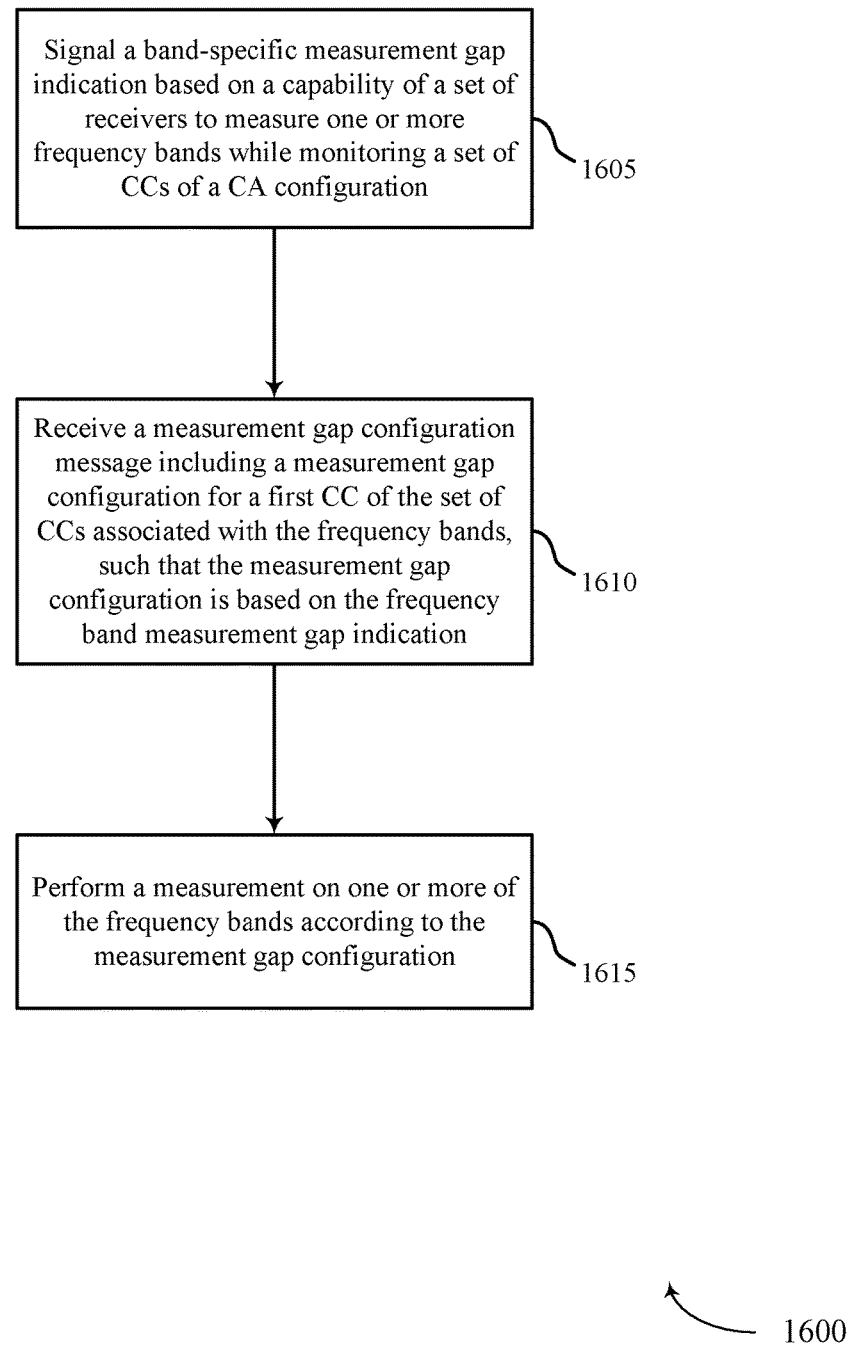

FIG. 16 shows a flowchart illustrating a method 1600 for measurement gaps in carrier aggregation in accordance with various aspects of the present disclosure. The operations of method 1600 may be implemented by a UE 115 or its components as described with reference to FIGS. 1-12. For example, the operations of method 1600 may be performed by the measurement gap manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1600 may also incorporate aspects of methods 1300, 1400, and 1500 of FIGS. 13-15.

At block 1605, the UE 115 may signal a band-specific measurement gap indication based at least in part on a capability of a plurality of receivers to measure one or more target frequency bands while monitoring a plurality of CCs of a CA configuration as described with reference to FIGS. 2-4. In certain examples, the operations of block 1605 may be performed by the measurement capability messaging module 605 as described with reference to FIG. 6.

At block 1610, the UE 115 may receive a measurement gap configuration message comprising a measurement gap configuration for at least one first CC of the plurality of CCs associated with at least one of the target frequency bands, such that the measurement gap configuration is based at least in part on the band-specific measurement gap indication as described with reference to FIGS. 2-4. In some cases, the measurement gap configuration message provides one or more gaps during which monitoring the at least one first CC can be interrupted for measuring the at least one of the target frequency bands. In certain examples, the operations of block 1610 may be performed by the gap configuration options module 610 as described with reference to FIG. 6.

At block 1615, the UE 115 may perform a measurement on one or more of the target frequency bands according to the measurement gap configuration as described with reference to FIGS. 2-4. In certain examples, the operations of block 1615 may be performed by the frequency band measurement module 715 as described with reference to FIG. 7.

Figure 17:
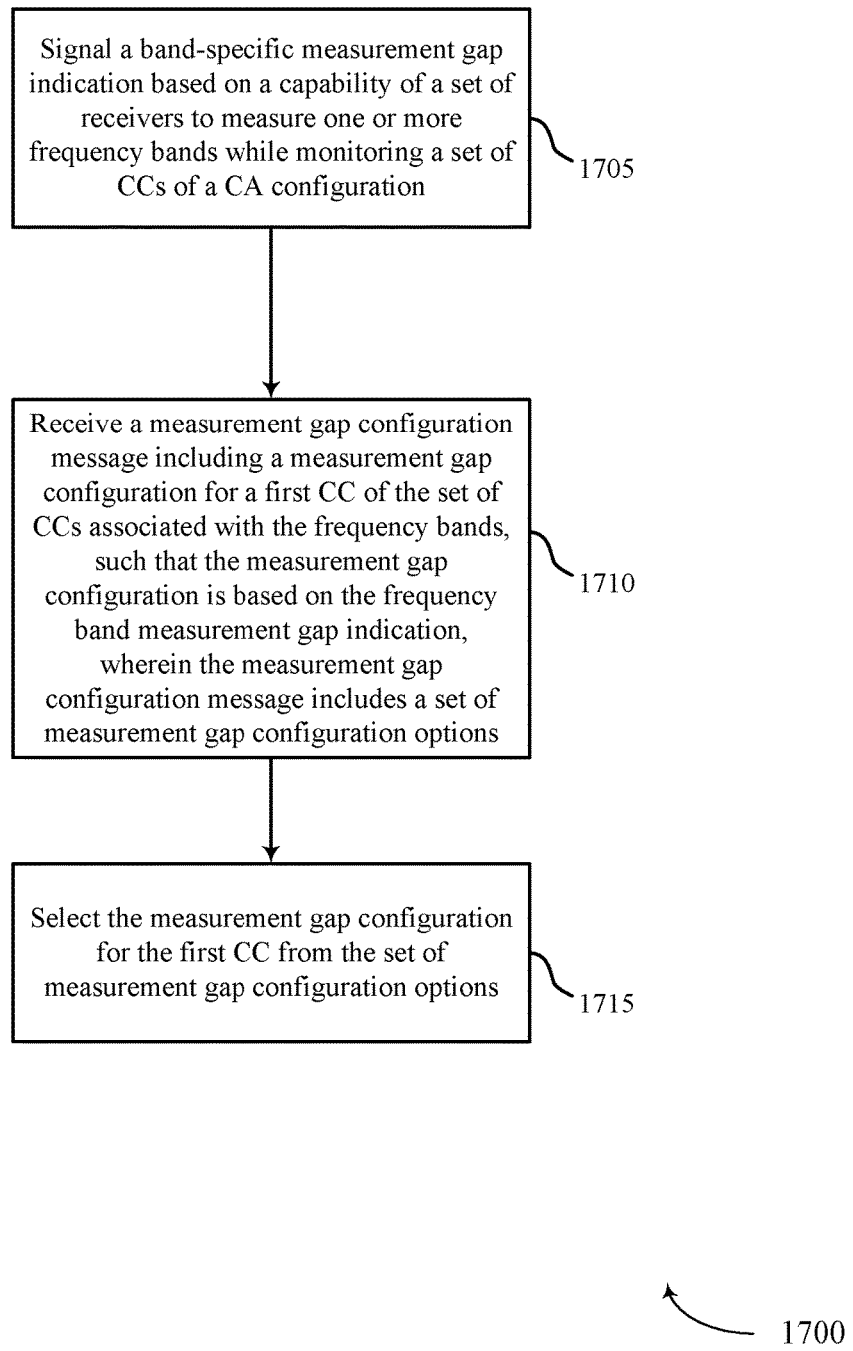

FIG. 17 shows a flowchart illustrating a method 1700 for measurement gaps in carrier aggregation in accordance with various aspects of the present disclosure. The operations of method 1700 may be implemented by a UE 115 or its components as described with reference to FIGS. 1-12. For example, the operations of method 1700 may be performed by the measurement gap manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1700 may also incorporate aspects of methods 1300, 1400, 1500, and 1600 of FIGS. 13-16.

At block 1705, the UE 115 may signal a band-specific measurement gap indication based at least in part on a capability of a plurality of receivers to measure one or more target frequency bands while monitoring a plurality of CCs of a CA configuration as described with reference to FIGS. 2-4. In certain examples, the operations of block 1705 may be performed by the measurement capability messaging module 605 as described with reference to FIG. 6.

At block 1710, the UE 115 may receive a measurement gap configuration message comprising a measurement gap configuration for at least one first CC of the plurality of CCs associated with at least one of the target frequency bands, such that the measurement gap configuration is based at least in part on the band-specific measurement gap indication as described with reference to FIGS. 2-4. In some cases, the measurement gap configuration message provides one or more gaps during which monitoring the at least one first CC can be interrupted for measuring the at least one of the target frequency bands. In some cases, the measurement gap configuration message comprises a plurality of measurement gap configuration options. In certain examples, the operations of block 1710 may be performed by the gap configuration options module 610 as described with reference to FIG. 6.

At block 1715, the UE 115 may select the measurement gap configuration for the at least one first CC from the plurality of measurement gap configuration options as described with reference to FIGS. 2-4. In certain examples, the operations of block 1715 may be performed by the measurement gap selection module 720 as described with reference to FIG. 7.

Figure 18:
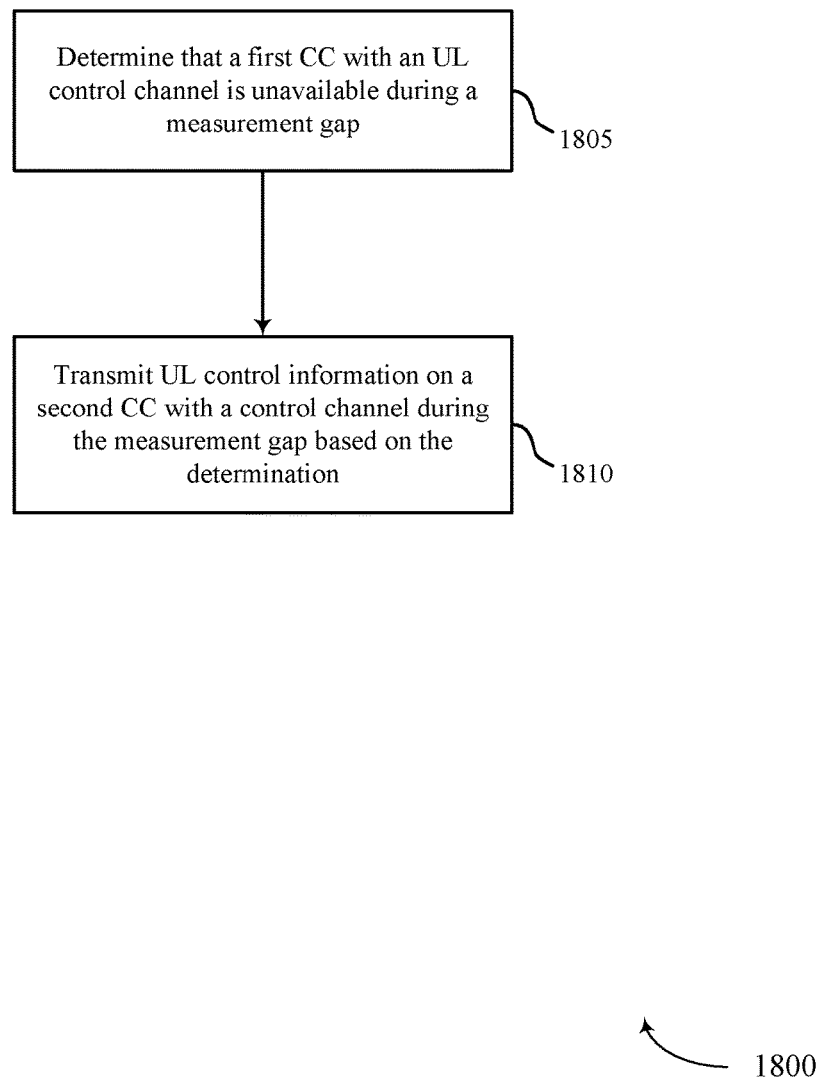

FIG. 18 shows a flowchart illustrating a method 1800 for measurement gaps in carrier aggregation in accordance with various aspects of the present disclosure. The operations of method 1800 may be implemented by a UE 115 or its components as described with reference to FIGS. 1-12. For example, the operations of method 1800 may be performed by the measurement gap manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1800 may also incorporate aspects of methods 1300, 1400, 1500, 1600, and 1700 of FIGS. 13-17.

At block 1805, the UE 115 may determine, in a CA configuration, that at least one first CC with an UL control channel is unavailable during a measurement gap as described with reference to FIGS. 2-4. In certain examples, the operations of block 1805 may be performed by the uplink channel availability module 725 as described with reference to FIG. 7.

At block 1810, the UE 115 may transmit UL control information on a second CC with a control channel during the measurement gap based at least in part on the determination as described with reference to FIGS. 2-4. In certain examples, the operations of block 1810 may be performed by the secondary uplink control messaging module 730 as described with reference to FIG. 7.

Figure 19:
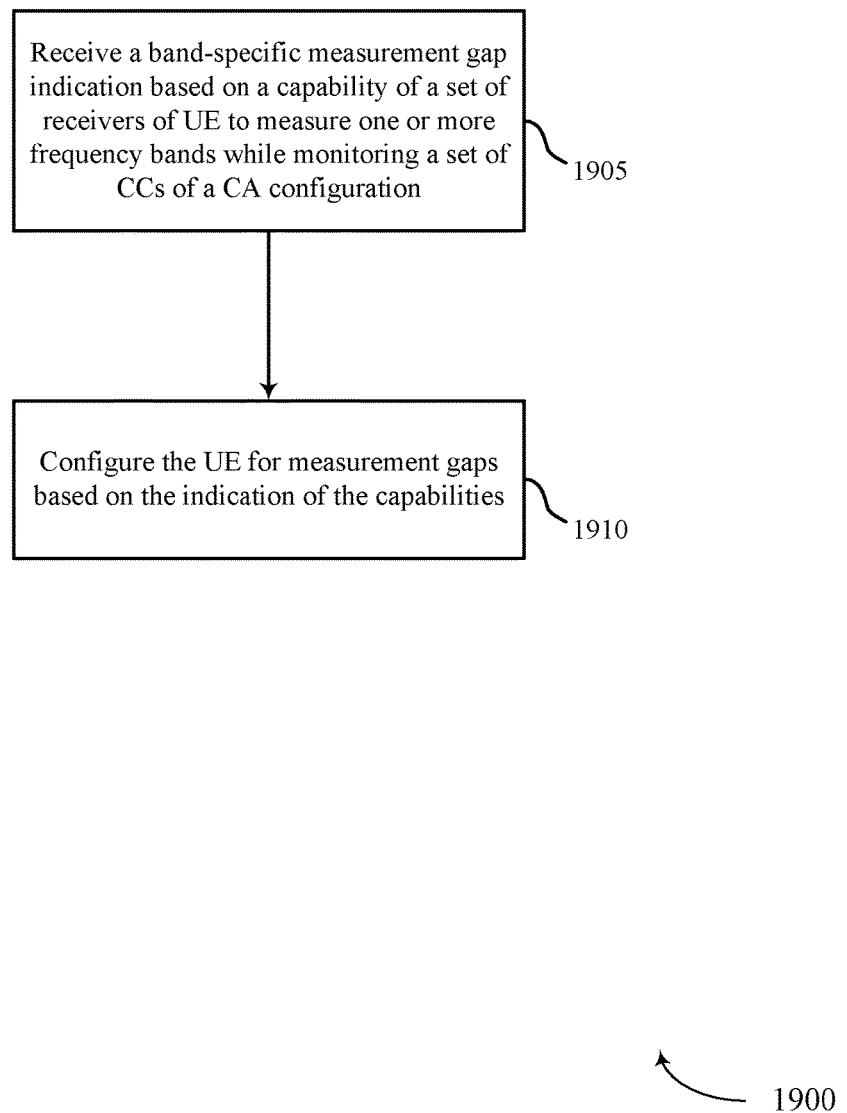

FIG. 19 shows a flowchart illustrating a method 1900 for measurement gaps in carrier aggregation in accordance with various aspects of the present disclosure. The operations of method 1900 may be implemented by a base station 105 or its components as described with reference to FIGS. 1-12. For example, the operations of method 1900 may be performed by the base station measurement gap manager 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 1900 may also incorporate aspects of methods 1300, 1400, 1500, 1600, 1700, and 1800 of FIGS. 13-18.

At block 1905, the base station 105 may receive a band-specific measurement gap indication based at least in part on a capability of a plurality of receivers of the UE to measure one or more target frequency bands while monitoring a plurality of CCs of a CA configuration as described with reference to FIGS. 2-4. In certain examples, the operations of block 1905 may be performed by the BS gap configuration options module 1005 as described with reference to FIG. 10.

At block 1910, the base station 105 may configure the UE for measurement gaps based at least in part on the band-specific measurement gap indication as described with reference to FIGS. 2-4. In certain examples, the operations of block 1910 may be performed by the UE configuration module 1010 as described with reference to FIG. 10.

Figure 20:
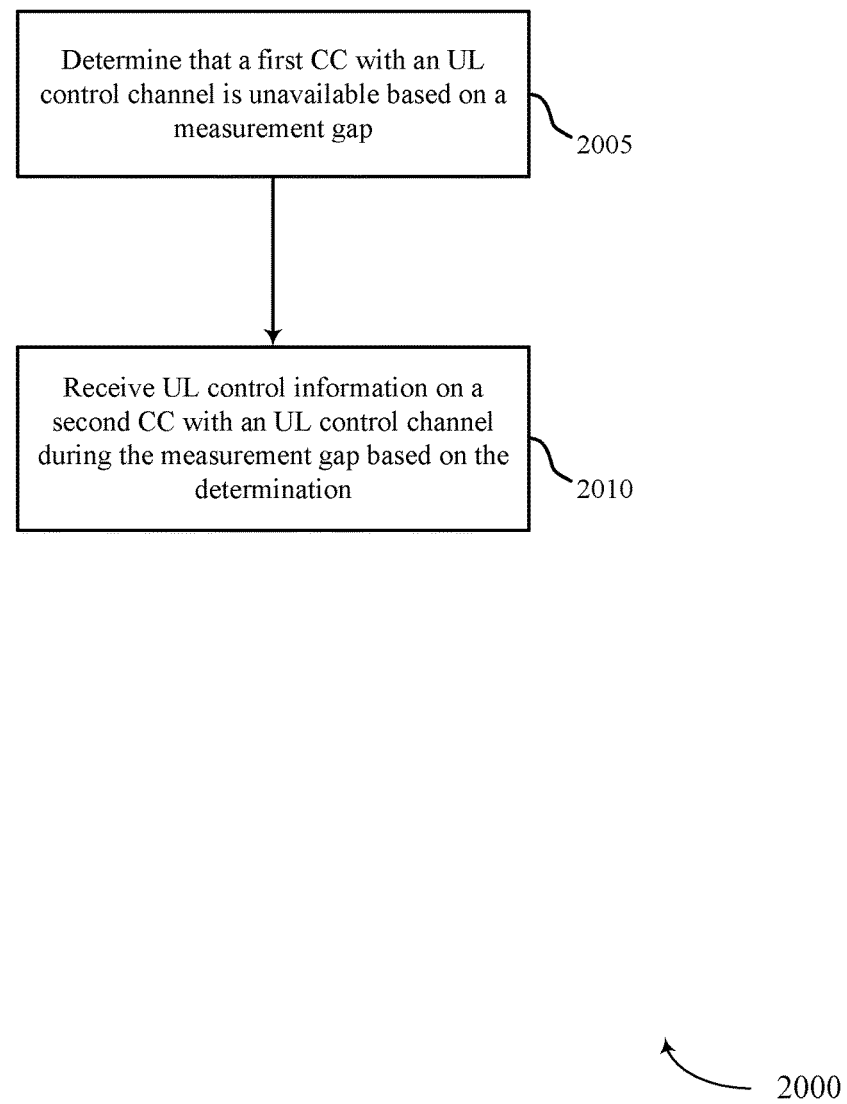

FIG. 20 shows a flowchart illustrating a method 2000 for measurement gaps in carrier aggregation in accordance with various aspects of the present disclosure. The operations of method 2000 may be implemented by a base station 105 or its components as described with reference to FIGS. 1-12. For example, the operations of method 2000 may be performed by the base station measurement gap manager 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 2000 may also incorporate aspects of methods 1300, 1400, 1500, 1600, 1700, 1800, and 1900 of FIGS. 13-19.

At block 2005, the base station 105 may determine, in a CA configuration, that at least one first CC with an UL control channel is unavailable based at least in part on a measurement gap configured for a UE as described with reference to FIGS. 2-4. In certain examples, the operations of block 2005 may be performed by the BS uplink channel availability module 1015 as described with reference to FIG. 10.

At block 2010, the base station 105 may receive, from the UE, UL control information on a second CC with an UL control channel during the measurement gap based at least in part on the determination as described with reference to FIGS. 2-4. In certain examples, the operations of block 2010 may be performed by the BS secondary uplink control messaging module 1020 as described with reference to FIG. 10.

Thus, methods 1300, 1400, 1500, 1600, 1700, 1800, 1900, and 2000 may provide for measurement gaps in carrier aggregation. It should be noted that methods 1300, 1400, 1500, 1600, 1700, 1800, 1900, and 2000 describe possible implementation, and that the operations and the steps may be rearranged or otherwise modified such that other implementations are possible. In some examples, aspects from two or more of the methods 1300, 1400, 1500, 1600, 1700, 1800, 1900, and 2000 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). "3rd Generation Partnership Project" (3GPP) LTE and LTE-advanced (LTE-a) are new releases of Universal Mobile Telecommunications System (UMTS) that use E-UTRA. UTRA, E-UTRA, UMTS, LTE, LTE-a, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple subcarriers (e.g., waveform signals of different frequencies). Each modulated signal may be sent on a different subcarrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, the method comprising:
signaling a band-specific measurement gap indication based at least in part on a capability of a plurality of receivers to measure one or more target frequency bands while monitoring a plurality of component carriers (CCs) of a carrier aggregation (CA) configuration; and
receiving a measurement gap configuration message comprising a measurement gap configuration for at least one first CC of the plurality of CCs associated with at least one of the one or more target frequency bands, wherein the measurement gap configuration message comprises an indication to monitor at least one second CC of the plurality of CCs during at least one gap of the measurement gap configuration for the at least one first CC and the measurement gap configuration is based at least in part on the band-specific measurement gap indication.

2. The method of claim 1, wherein
the band-specific measurement gap indication comprises an indication of a subset of the plurality of CCs associated with measuring each of the one or more target frequency bands.

3. The method of claim 2, wherein
the band-specific measurement gap indication comprises a bitmap associating each of the plurality of CCs with measurement gaps on the one or more target frequency bands.

4. The method of claim 1, further comprising:
signaling one or more measurement gap patterns available for use with the CA configuration.

5. The method of claim 1, wherein
the measurement gap configuration message comprises an indication of one or more gaps during which monitoring the at least one first CC can be interrupted for measuring at least one of the one or more target frequency bands while monitoring for transmissions on other CCs.

6. The method of claim 1, wherein
the measurement gap configuration message comprises an indication of different measurement gap configurations for different CCs of the plurality of CCs.

7. The method of claim 1, wherein
the band-specific measurement gap indication comprises a separate indication based at least in part on the capability of each of the plurality of receivers to measure combinations of the one or more target frequency bands.

8. The method of claim 1, wherein
the measurement gap configuration message comprises an indication not to perform measurements on the at least one first CC during a measurement gap.

9. The method of claim 1, further comprising:
transmitting an uplink control message associated with the at least one second CC during the at least one gap for the at least one first CC.

10. The method of claim 1, wherein
the band-specific measurement gap indication comprises a plurality of supported frequency band measurement gap associations corresponding to a plurality of CA receiver configurations.

11. The method of claim 1, further comprising:
performing a measurement on at least one of the one or more target frequency bands according to the measurement gap configuration wherein monitoring at least one of the plurality of CC continues while performing the measurement.

12. The method of claim 1, wherein
the one or more target frequency bands comprise one or more frequency bands in a shared spectrum or an unlicensed spectrum.

13. The method of claim 1, wherein
the measurement gap configuration message comprises a plurality of measurement gap configuration options; and
the method further comprising selecting the measurement gap configuration for the at least one first CC from the plurality of measurement gap configuration options and signaling the selected measurement gap configuration.

14. The method of claim 13, wherein
the measurement gap configuration is selected based at least in part on minimizing disruption of monitoring the plurality of CCs, minimizing disruption of uplink (UL) transmission, or both.

15. A method of wireless communication, the method comprising:
receiving a band-specific measurement gap indication based at least in part on a capability of a plurality of receivers of a user equipment (UE) to measure one or more target frequency bands while monitoring a plurality of component carriers (CCs) of a carrier aggregation (CA) configuration; and
configuring the UE for measurement gaps based at least in part on the band-specific measurement gap indication, wherein configuring the UE for the measurement gaps comprises an indication to monitor at least one second CC of the plurality of CCs during at least one gap of the measurement gaps corresponding to at least one first CC of the plurality of CCs.

16. The method of claim 15, wherein configuring the UE for measurement gaps comprises:
selecting a measurement gap pattern from a plurality of patterns based at least in part on a length of measurement gaps in the measurement gap pattern.

17. The method of claim 15, further comprising:
determining a measurement gap configuration for the plurality of CCs based at least in part on uplink (UL) interruptions for a corresponding UL configuration, wherein the measurement gaps are configured based at least in part on the determination.

18. The method of claim 17, wherein determining the measurement gap configuration for the plurality of CCs based at least in part on a corresponding UL configuration comprises:
determining whether the corresponding UL configuration comprises an UL control channel, determining whether UL control information is sent on the UL control channel, or both.

19. The method of claim 15, further comprising:
determining a measurement gap configuration for the plurality of CCs based at least in part on minimizing downlink (DL) interruptions on the plurality of CCs, wherein the measurement gaps are configured based at least in part on the determination.

20. The method of claim 15, further comprising:
determining from the CA configuration a CC having a lowest signal to interference plus noise ratio (SINK) among the plurality of CCs of the CA configuration, or a CC with greater loading than other CCs of CA configuration, or both, wherein the measurement gaps are configured based at least in part on the determination.

21. An apparatus for wireless communication, comprising:
means for signaling a band-specific measurement gap indication based at least in part on a capability of a plurality of receivers to measure one or more target frequency bands while monitoring a plurality of component carriers (CCs) of a carrier aggregation (CA) configuration; and
means for receiving a measurement gap configuration message comprising a measurement gap configuration for at least one first component carrier (CC) of the plurality of CCs associated with at least one of the one or more target frequency bands, wherein the measurement gap configuration message comprises an indication to monitor at least one second CC of the plurality of CCs during at least one gap of the measurement gap configuration for the at least one first CC and the measurement gap configuration is based at least in part on the band-specific measurement gap indication.

22. The apparatus of claim 21, wherein
the band-specific measurement gap indication comprises an indication of a subset of the plurality of CCs associated with measuring each of the one or more target frequency bands.

23. The apparatus of claim 21, further comprising:
means for signaling one or more measurement gap patterns available for use with the CA configuration.

24. The apparatus of claim 21, wherein
the band-specific measurement gap indication comprises a separate indication based at least in part on the capability of each of the plurality of receivers to measure combinations of the one or more target frequency bands.

25. An apparatus for wireless communication, comprising:
means for receiving a band-specific measurement gap indication based at least in part on a capability of a plurality of receivers of user equipment (UE) to measure one or more target frequency bands while monitoring a plurality of component carriers (CCs) of a carrier aggregation (CA) configuration; and
means for configuring the UE for measurement gaps based at least in part on the band-specific measurement gap indication, wherein configuring the UE for the measurement gaps comprises an indication to monitor at least one second CC of the plurality of CCs during at least one gap of the measurement gaps corresponding to at least one first CC of the plurality of CCs.

26. The apparatus of claim 25, wherein configuring the UE for measurement gaps comprises:
selecting a measurement gap pattern from a plurality of patterns based at least in part on a length of measurement gaps in the measurement gap pattern.

27. The apparatus of claim 25, further comprising:
means for determining a measurement gap configuration for the plurality of CCs based at least in part on uplink (UL) interruptions for a corresponding UL configuration, wherein the measurement gaps are configured based at least in part on the determination.

28. The apparatus of claim 25, further comprising:
means for determining a measurement gap configuration for the plurality of CCs based at least in part on minimizing downlink (DL) interruptions on the plurality of CCs, wherein the measurement gaps are configured based at least in part on the determination.

29. An apparatus for wireless communication, the apparatus comprising:
memory storing instructions; and
a processor, in electronic communication with the memory, wherein execution of the instructions causes the processor to:
signal a band-specific measurement gap indication based at least in part on a capability of a plurality of receivers to measure one or more target frequency bands while monitoring a plurality of component carriers (CCs) of a carrier aggregation (CA) configuration; and
receive a measurement gap configuration message comprising a measurement gap configuration for at least one first component carrier (CC) of the plurality of CCs associated with at least one of the one or more target frequency bands, wherein the measurement gap configuration message comprises an indication to monitor at least one second CC of the plurality of CCs during at least one gap of the measurement gap configuration for the at least one first CC and the measurement gap configuration is based at least in part on the band-specific measurement gap indication.

30. The apparatus of claim 29, wherein execution of the instructions causes the processor to:
transmit an uplink control message associated with the at least one second CC during the at least one gap.

31. The apparatus of claim 29, wherein the band-specific measurement gap indication comprises an indication of a subset of the plurality of CCs associated with measuring each of the one or more target frequency bands.

32. The apparatus of claim 31, wherein
the band-specific measurement gap indication comprises a bitmap associating each of the plurality of CCs with measurement gaps on the one or more target frequency bands.

33. The apparatus of claim 29, wherein execution of the instructions causes the processor to:
signal one or more measurement gap patterns available for use with the CA configuration.

34. The apparatus of claim 29, wherein
the band-specific measurement gap indication comprises a plurality of supported frequency band measurement gap associations corresponding to a plurality of CA receiver configurations.

35. The apparatus of claim 29, wherein execution of the instructions causes the processor to:
perform a measurement on at least one of the one or more target frequency bands according to the measurement gap configuration.

36. The apparatus of claim 29, wherein
the measurement gap configuration message comprises a plurality of measurement gap configuration options; and
wherein the instructions are operable to cause the apparatus to select the measurement gap configuration for the at least one first CC from the plurality of measurement gap configuration options.

37. The apparatus of claim 36, wherein
the measurement gap configuration is selected based at least in part on minimizing disruption of monitoring the plurality of CCs, minimizing disruption of uplink (UL) transmission, or both.

38. The apparatus of claim 29, wherein
the band-specific measurement gap indication comprises a separate indication based at least in part on the capability of each of the plurality of receivers to measure combinations of the one or more target frequency bands.

39. An apparatus for wireless communication, the apparatus comprising:
memory storing instructions; and
a processor, in electronic communication with the memory, wherein execution of the instructions causes the processor to:
receive a band-specific measurement gap indication based at least in part on a capability of a plurality of receivers of user equipment (UE) to measure one or more target frequency bands while monitoring a plurality of component carriers (CCs) of a carrier aggregation (CA) configuration; and
configure the UE for measurement gaps based at least in part on the band-specific measurement gap indication, wherein configuring the UE for the measurement gaps comprises an indication to monitor at least one second CC of the plurality of CCs during at least one gap of the measurement gaps corresponding to at least one first CC of the plurality of CCs.

40. The apparatus of claim 39, wherein configuring the UE for measurement gaps comprises:
selecting a measurement gap pattern from a plurality of patterns based at least in part on a length of measurement gaps in the measurement gap pattern.

41. The apparatus of claim 39, wherein execution of the instructions causes the processor to:
determine a measurement gap configuration for the plurality of CCs based at least in part on uplink (UL) interruptions for a corresponding UL configuration, wherein the measurement gaps are configured based at least in part on the determination.

42. The apparatus of claim 41, wherein determining the measurement gap configuration for the plurality of CCs based at least in part on a corresponding UL configuration comprises:
determining whether the corresponding UL configuration comprises an UL control channel, determining whether UL control information is sent on the UL control channel, or both.

43. The apparatus of claim 39, wherein execution of the instructions causes the processor to:
determine a measurement gap configuration for the plurality of CCs based at least in part on minimizing downlink (DL) interruptions on the plurality of CCs, wherein the measurement gaps are configured based at least in part on the determination.

44. The apparatus of claim 39, wherein execution of the instructions causes the processor to:
determine from the CA configuration a CC having a lowest signal to interference plus noise ratio (SINK) among the plurality of CCs of the CA configuration, or a CC with greater loading than other CCs of CA configuration, or both, wherein the measurement gaps are configured based at least in part on the determination.

45. A non-transitory computer-readable medium storing code for wireless communication, the code comprising instructions which when executed cause a processor to:
  signal a band-specific measurement gap indication based at least in part on a capability of a plurality of receivers to measure one or more target frequency bands while monitoring a plurality of component carriers (CCs) of a carrier aggregation (CA) configuration; and
  receive a measurement gap configuration message comprising a measurement gap configuration for at least one first CC of the plurality of CCs associated with at least one of the one or more target frequency bands, wherein the measurement gap configuration message comprises an indication to monitor at least one second CC of the plurality of CCs during at least one gap of the measurement gap configuration for the at least one first CC and the measurement gap configuration is based at least in part on the band-specific measurement gap indication.

46. A non-transitory computer-readable medium storing code for wireless communication, the code comprising instructions which when executed cause a processor to:
  receive a band-specific measurement gap indication based at least in part on a capability of a plurality of receivers of user equipment (UE) to measure one or more target frequency bands while monitoring a plurality of component carriers (CCs) of a carrier aggregation (CA) configuration; and
  configure the UE for measurement gaps based at least in part on the band-specific measurement gap indication, wherein configuring the UE for the measurement gaps comprises an indication to monitor at least one second CC of the plurality of CCs during at least one gap of the measurement gaps corresponding to at least one first CC of the plurality of CCs.

* * * * *